US012624269B2

(12) United States Patent
Kramer et al.

(10) Patent No.: US 12,624,269 B2
(45) Date of Patent: May 12, 2026

(54) HEAT TRANSFER FLUIDS COMPRISING ISOMERIC BRANCHED PARAFFIN DIMERS DERIVED FROM LINEAR ALPHA OLEFINS AND USE THEREOF

(71) Applicant: ExxonMobil Chemical Patents Inc., Baytown, TX (US)

(72) Inventors: Anatoly I. Kramer, Baytown, TX (US); Jorg F.W. Weber, Houston, TX (US); Kyle G. Lewis, Houston, TX (US); Behrouz Engheta, Hamburg (DE); Heinrich R. Braun, Tiefenbach (DE); Tobias Klande, Winsen (DE); Mark P. Hagemeister, Morris Plains, NJ (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 545 days.

(21) Appl. No.: 18/245,925

(22) PCT Filed: Sep. 28, 2021

(86) PCT No.: PCT/US2021/052479
§ 371 (c)(1),
(2) Date: Mar. 20, 2023

(87) PCT Pub. No.: WO2022/076207
PCT Pub. Date: Apr. 14, 2022

(65) Prior Publication Data

US 2023/0365850 A1 Nov. 16, 2023

Related U.S. Application Data

(60) Provisional application No. 63/089,501, filed on Oct. 8, 2020.

(51) Int. Cl.
*C09K 5/10* (2006.01)
*B60L 58/26* (2019.01)
(Continued)

(52) U.S. Cl.
CPC ................ *C09K 5/10* (2013.01); *B60L 58/26* (2019.02); *H01M 10/613* (2015.04); *H01M 10/6567* (2015.04)

(58) Field of Classification Search
CPC ........ C09K 5/10; B60L 58/26; H01M 10/613; H01M 10/6567; H01M 10/625;
(Continued)

(56) References Cited

U.S. PATENT DOCUMENTS 1,815,022 A 7/1931 Davis
2,015,748 A 10/1935 Frolich
(Continued)

FOREIGN PATENT DOCUMENTS

EP 0741120 B1 3/2003
WO 02/097017 A1 12/2002
(Continued)

OTHER PUBLICATIONS

Lenert, A. et al., (2012) "Heat transfer fluids", Annual Review of Heat Transfer, No. 15, Retrieved from Internet URL: <https://dspace.mit.edu/bitstream/handle/1721.1/93173/Post-print.pdf?sequence=1>, 57 Pages.
(Continued)

*Primary Examiner* — Cephia D Toomer
(74) *Attorney, Agent, or Firm* — Vorys, Sater, Seymour and Pease LLP

(57) ABSTRACT

Branched paraffins formed as a hydrogenated reaction product of one or more linear alpha olefins (LAOs) oligomerized with a $BF_3$ catalyst system and comprising at least about 90 wt. % branched paraffin dimers may have advantageous heat
(Continued)

transfer properties. Heat transfer fluids comprising the branched paraffins may be placed in contact with a heat-generating component, such as those found in electric vehicles, battery systems, and other locations in need of thermal management. Branched paraffin dimers formed from one or more LAOs having about 8 to about 12 carbon atoms may collectively have a Mouromtseff Number ranging from about 10,000 to about 16,000 kg/($s^{2.2}$·$m^{0.6}$·K) at 80° C. a thermal conductivity at 80° C. of about 0.125 W/m·K or higher, and a flash point of about 140° C. or higher.

33 Claims, 2 Drawing Sheets

(51) Int. Cl.
*H01M 10/613* (2014.01)
*H01M 10/6567* (2014.01)

(58) Field of Classification Search
CPC .......... H01M 2220/20; H01M 10/6568; G06F 2200/201; G06F 1/20; Y02E 60/10; Y02T 10/70
See application file for complete search history.

(56) References Cited

U.S. PATENT DOCUMENTS

| | | | | |
|---|---|---|---|---|
| 2,191,498 | A | 2/1940 | Reiff | |
| 2,387,501 | A | 10/1945 | Dietrich | |
| 2,655,479 | A | 10/1953 | Munday et al. | |
| 2,666,746 | A | 1/1954 | Munday et al. | |
| 2,721,877 | A | 10/1955 | Popkin et al. | |
| 2,721,878 | A | 10/1955 | Popkin | |
| 3,149,178 | A * | 9/1964 | Hamilton | C10M 3/00 208/18 |
| 3,197,405 | A | 7/1965 | Suer | |
| 3,250,715 | A | 5/1966 | Wyman | |
| 3,382,291 | A | 5/1968 | Brennan | |
| 3,742,082 | A * | 6/1973 | Brennan | C07C 2/20 585/510 |
| 4,016,245 | A | 4/1977 | Plank et al. | |
| 4,076,842 | A | 2/1978 | Plank et al. | |
| 4,239,638 | A * | 12/1980 | Beretta | F24D 17/0068 585/12 |
| 4,556,477 | A | 12/1985 | Dwyer | |
| 4,798,684 | A | 1/1989 | Salomon | |
| 4,827,064 | A | 5/1989 | Wu | |
| 4,827,073 | A | 5/1989 | Wu | |
| 4,956,122 | A | 9/1990 | Watts et al. | |
| 5,068,487 | A | 11/1991 | Theriot | |
| 5,084,197 | A | 1/1992 | Galic et al. | |
| 5,171,905 | A * | 12/1992 | Theriot | C10M 107/10 585/12 |
| 5,171,918 | A | 12/1992 | Shubkin et al. | |
| 5,246,566 | A | 9/1993 | Miller | |
| 5,250,750 | A * | 10/1993 | Shubkin | C07C 2/20 585/12 |
| 5,817,899 | A * | 10/1998 | Hope | C10M 107/10 585/16 |
| 6,075,174 | A | 6/2000 | Presedo | |
| 6,080,301 | A | 6/2000 | Berlowitz et al. | |
| 6,090,989 | A | 7/2000 | Trewella et al. | |
| 6,165,949 | A | 12/2000 | Berlowitz et al. | |
| 6,790,386 | B2 * | 9/2004 | Fefer | H01B 3/22 252/570 |
| 7,704,930 | B2 | 4/2010 | Deckman et al. | |
| 2006/0211904 | A1 | 9/2006 | Goze et al. | |
| 2012/0264661 | A1 | 10/2012 | Tsubouchi | |
| 2020/0199474 | A1 * | 6/2020 | Hill, Jr. | C09J 11/06 |

FOREIGN PATENT DOCUMENTS

| | | | |
|---|---|---|---|
| WO | 2011/113851 | A1 | 9/2011 |
| WO | 2016/157958 | A1 | 10/2016 |
| WO | 2016/157960 | A1 | 10/2016 |
| WO | 2017/001487 | A1 | 1/2017 |
| WO | 2022/076207 | A1 | 4/2022 |

OTHER PUBLICATIONS

Mouromtseff, I. E., (1942) "Water and forced-air cooling of vacuum tubes nonelectronic problems in electronic tubes", Proceedings of the IRE, vol. 30, No. 4, pp. 190-205.
International Preliminary Report on Patentability received for PCT Application No. PCT/US2021/052479, mailing date Apr. 4, 2023, 7 Pages.
International Search Report and Written Opinion received for PCT Application No. PCT/US2021/052479, mailing date Jan. 21, 2022, 9 Pages.
Klamann, D, et al. (1985) "Lubricants and Related Products", British Polymer Journal, vol. 17, No. 2, p. 253-254.
Tsubouchi, T. et al. (2010) "Development Study of Motor Cooland as well as Lubricant for HEV/EV" Society of Automotive Engineers of Japan, Academic Lectures Preprint Collection, No. 155-10, 6 pages.

* cited by examiner

HEAT TRANSFER FLUIDS COMPRISING ISOMERIC BRANCHED PARAFFIN DIMERS DERIVED FROM LINEAR ALPHA OLEFINS AND USE THEREOF

PRIORITY

This application is a National Phase Application claiming priority to PCT Application Serial No. PCT/US2021/052479 filed Sep. 28, 2021, which claims priority to and the benefit of U.S. Provisional Application No. 63/089,501, filed Oct. 8, 2020, the disclosure of U.S. Provisional Application No. 63/089,501 is incorporated herein by reference in its entirety.

This application claims priority to and the benefit of U.S. Provisional Application No. 63/089,501, filed Oct. 8, 2020, the disclosure of which is incorporated herein by reference in its entirety.

FIELD

The present disclosure relates to heat transfer fluids, and methods for their production and use.

BACKGROUND

In the electric vehicle industry, numerous advances in battery technology have been made in recent years to promote greater power delivery and decreased charging frequency. Among the advancements needed to progress electric vehicle technology further is the development of more effective cooling systems for promoting heat transfer from various electric vehicle (EV) components. Particular components of electric vehicles that may be in need of improved heat transfer include, for example, one or more batteries, axles, EV power electronics, and/or an electric motor. Rapid charging stations for electric vehicles may similarly be in need of efficient cooling. While the components of an electric vehicle may be cooled to varying degrees using conventional jacketed cooling fluids and technology, such as aqueous glycol solutions also used in conjunction with internal combustion engines, effective cooling of the batteries of an electric vehicle through direct cooling fluid contact represents an entirely different challenge.

All batteries generate heat as they charge or discharge. The more rapid the rate of charge or discharge becomes, the greater the amount of heat generated per unit time. For small batteries, exposure to ambient atmosphere may effectively dissipate the discharged heat, such that separate cooling systems are not required. In electric vehicles, the large battery size and the rapid discharge rates needed to ensure satisfactory vehicle performance make heat dissipation much more of a concern. Likewise, rapid battery charging at electric vehicle recharging stations may also result in significant battery heating and present similar thermal management issues.

In addition to influencing or governing vehicle performance, battery temperatures outside a preferred operating range, typically from about 15° C. to 35° C. for lithium-ion batteries, may negatively impact the battery's performance. Internal temperature gradients between the various cells of a battery may similarly impact the battery's performance. Moreover, in addition to poor battery or vehicle performance, operating a battery outside a preferred temperature range and/or with an internal thermal gradient may increase the risk for battery failure, runaway overheating, fire and/or explosion. Therefore, effective thermal management during battery charge or discharge and vehicle operation may become a limiting factor in how much the performance of electric vehicles may be further advanced.

Current strategies for cooling the batteries of an electric vehicle may employ one or more of a phase change material, heat-dissipating fins, or air cooling. Each of these approaches may have significant limitations, either in terms of the quantity of heat they are able to dissipate directly from the battery and/or due to their impact upon vehicle performance. Heat-dissipating fins, for example, introduce excess weight that must be carried by the vehicle as it travels, thereby lowering the vehicle's efficiency and performance.

Cooling systems employing a heat transfer fluid are another heat-dissipating strategy that may be employed for batteries and other heat-generating components of electric vehicles. Since fluids may exhibit higher thermal conductivity and heat capacity values than air, fluids may promote more effective heat dissipation from a battery or other heat-generating component than do other heat-dissipating strategies. Moreover, a fluid may be placed in direct surface contact with a battery, electric motor or other heat-generating component to promote optimal heat transfer, including configurations in which the heat-generating component is partially or fully immersed in the heat transfer fluid. For example, direct immersive cooling of this sort may help reduce the risk of uncontrolled thermal runaway within battery modules in which one battery cell is compromised through short circuiting or physical damage. Alternately, a suitable heat transfer fluid may be jacketed around and/or circulated through a heat-generating component, such as a battery or EV power component. While immersion or partial immersion of a heat-generating component in a heat transfer fluid may afford optimal heat transfer, many heat transfer fluids presently in common use are unsuitable for immersion of batteries and/or electric motors therein due to electrical conductivity of the fluid. Aqueous heat transfer fluids, such as aqueous glycol solutions, for example, may be unsuitable for immersion of a battery or electric motor because the high electrical conductivity may lead to shorting and battery or motor failure that may occur when the heat transfer fluid contacts the battery's leads or various electrical components in the motor. Fluorocarbon fluids may meet certain performance requirements for suitable heat transfer fluids, including satisfactory pour point values and flash point values, but fumes from burning of the fluids may lead to undesirable health and environmental effects. To date, suitable insulating heat transfer fluids having acceptable heat transfer characteristics in combination with an acceptable flash point, pour point and health/environmental profile have yet to be identified.

In addition to the growing need for improved heat transfer fluids for use in the electric vehicle industry, there are also significant needs for effective thermal management in emerging technologies such as, for example, data centers and server farms, high-power electronic components, and 5G communication systems. Various application-specific needs may dictate particular formulation requirements for heat transfer fluids used in these and other applications.

SUMMARY

In some embodiments, the present disclosure provides heat transfer fluids comprising a plurality of isomeric branched paraffins comprising a hydrogenated reaction product of one or more linear alpha olefins (LAOs) oligomerized with a $BF_3$ catalyst system, the plurality of isomeric branched paraffins comprising at least about 90 wt.

% isomeric branched paraffin dimers. The one or more LAOs have about 8 to about 12 carbon atoms. The plurality of isomeric branched paraffins collectively have a Mouromtseff Number ranging from about 10,000 to about 16,000 kg/($s^{2.2}$·$m^{0.6}$·K) at 80° C., a thermal conductivity at 80° C. of about 0.125 W/m·K or higher, and a flash point of about 140° C. or higher.

In other embodiments, the present disclosure provides battery systems comprising a heat transfer fluid. The battery systems comprise a battery and a heat transfer fluid in contact with the battery. The heat transfer fluid comprises a plurality of isomeric branched paraffins comprising a hydrogenated reaction product of one or more linear alpha olefins (LAOs) oligomerized with a $BF_3$ catalyst system, the plurality of isomeric branched paraffins comprising at least about 90 wt. % isomeric branched paraffin dimers. The one or more LAOs have about 8 to about 12 carbon atoms. The plurality of isomeric branched paraffins collectively have a Mouromtseff Number ranging from about 10,000 to about 16,000 kg/($s^{2.2}$·$m^{0.6}$·K) at 80° C., a thermal conductivity at 80° C. of about 0.125 W/m·K or higher, and a flash point of about 140° C. or higher.

In still other embodiments, the present disclosure provides electric vehicles comprising a heat-generating component, and a heat transfer fluid in contact with the heat-generating component. The heat transfer fluid comprises a plurality of isomeric branched paraffins comprising a hydrogenated reaction product of one or more linear alpha olefins (LAOs) oligomerized with a $BF_3$ catalyst system, the plurality of isomeric branched paraffins comprising at least about 90 wt. % isomeric branched paraffin dimers. The one or more LAOs have about 8 to about 12 carbon atoms. The plurality of isomeric branched paraffins collectively have a Mouromtseff Number ranging from about 10,000 to about 16,000 kg/($s^{2.2}$·$m^{0.6}$·K) at 80° C., a thermal conductivity at 80° C. of about 0.125 W/m·K or higher, and a flash point of about 140° C. or higher.

In yet still other embodiments, the present disclosure provides thermal management methods utilizing a heat transfer fluid. The methods comprise providing a heat transfer fluid, and operating or placing a heat-generating component in contact with the heat transfer fluid. The heat transfer fluid comprises a plurality of isomeric branched paraffins comprising a hydrogenated reaction product of one or more linear alpha olefins (LAOs) oligomerized with a $BF_3$ catalyst system, the plurality of isomeric branched paraffins comprising at least about 90 wt. % isomeric branched paraffin dimers. The one or more LAOs have about 8 to about 12 carbon atoms. The plurality of isomeric branched paraffins collectively have a Mouromtseff Number ranging from about 10,000 to about 16,000 kg/($s^{2.2}$·$m^{0.6}$·K) at 80° C., a thermal conductivity at 80° C. of about 0.125 W/m·K or higher, and a flash point of about 140° C. or higher.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, as will occur to one of ordinary skill in the art and having the benefit of this disclosure.

DETAILED DESCRIPTION

Figure 1:
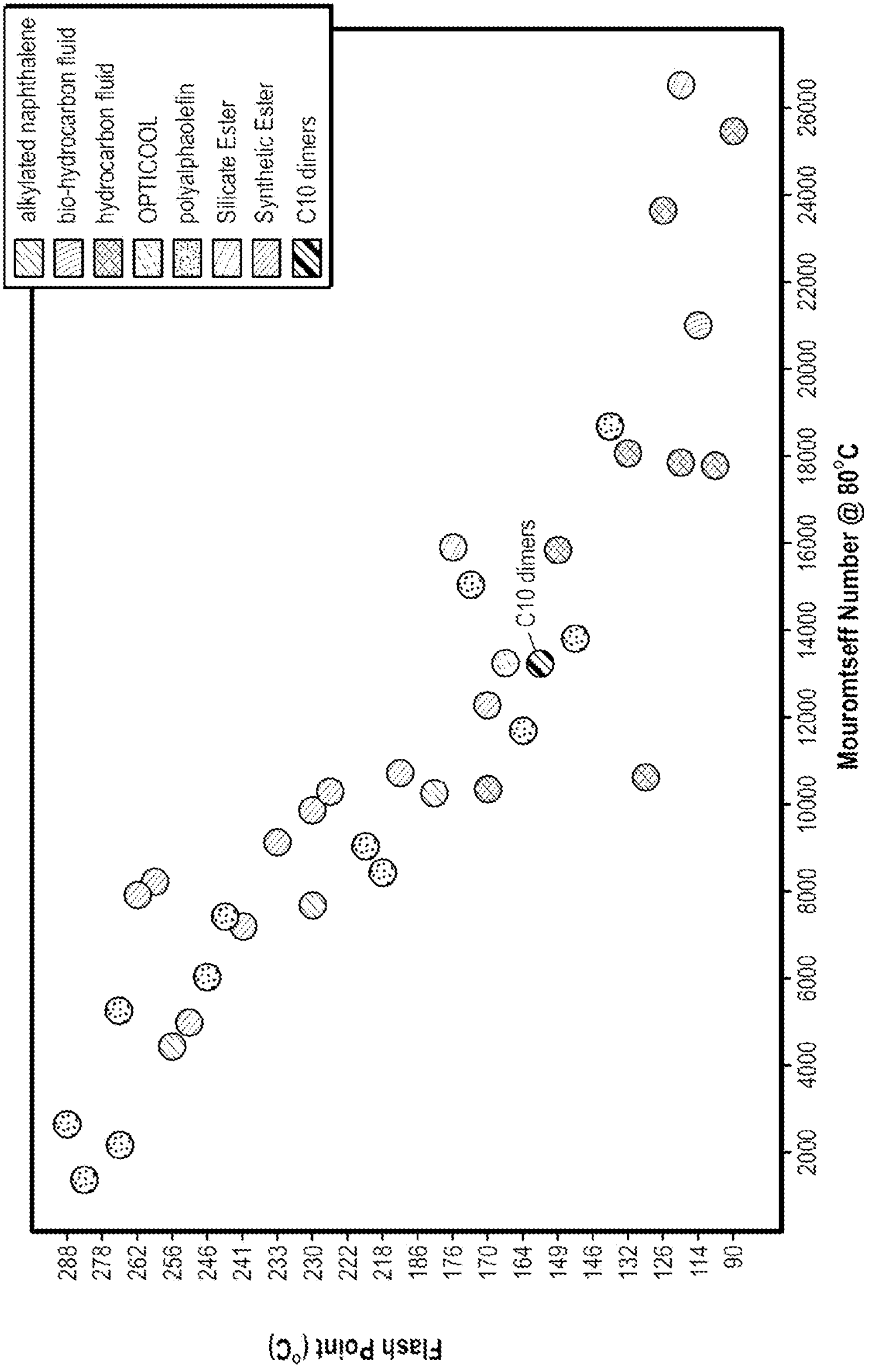
FIG. 1 shows a plot of flash point versus Mouromtseff Number for various heat transfer fluids.

The present disclosure relates to thermal management and, more specifically, to heat transfer fluids featuring predominantly isomeric branched paraffin dimers and methods related thereto. The heat transfer fluids may be utilized for thermal management in electric vehicles and in other locales in need of effective heat transfer.

As discussed above, effective thermal management in electric vehicles can be challenging, particularly with respect to cooling systems designed for maintaining the batteries or other electrical components of an electric vehicle in a desired operating temperature range, such as from about 15° C. to about 35° C. in the case of lithium-ion batteries, while also preserving vehicle performance and high operational efficiency. Without effective thermal management, catastrophic battery and/or vehicle failure may occur. For example, at a battery temperature above about 140° C., a runaway reaction may occur without effectively cooling. To provide an adequate operating safety margin, a maximum operating temperature of about 70° C. may be used in some instances, and even then over short time periods. If a runaway reaction results due to inadequate cooling and/or cooling system failure, the battery temperature may jump to approximately 700° C., resulting in a fire. Cooling systems utilizing heat transfer fluids offer the best thermal management performance to date, but many heat transfer fluids, such as aqueous glycol solutions, are unsuitable for direct immersion of a battery or electric motor therein due to the fluid's electrical conductivity, thereby limiting the amount of heat transfer that may take place. Accordingly, further technological advancement of electric vehicles may be limited by performance shortcomings of existing heat transfer fluids.

The present disclosure demonstrates that certain abundant products of the chemical and petroleum industries may be suitable precursors for forming heat transfer fluids that are substantially insulating and have good thermal management performance and other properties that are highly compatible for use in conjunction with batteries that are currently used in electric vehicles, as well as for other heat transfer applications. More specifically, linear alpha olefins (LAOs) may serve as a precursor for forming branched LAO oligomers in the presence of an acid catalyst system, such as $BF_3$ and suitable promoters ($BF_3$ catalyst system), which may then be further hydrogenated to form the corresponding branched paraffins as a reaction product. Other acid catalyst systems, such as those comprising $AlCl_3$ or $BF_3$ complexes and promoters, may also be effective for forming LAO oligomers and isomeric branched paraffins produced therefrom for use in the disclosure herein. Dimers, trimers, tetramers and higher oligomers may be produced from oligomerization of the LAOs with a $BF_3$ catalyst system. A plurality of isomeric branched paraffins of each oligomer size may be formed when oligomerizing LAOs with $BF_3$, wherein the isomeric branched paraffins may have branches extending over the entirety of the carbon chain, and the branches may be of various sizes. Although dimers are typically formed as a less abundant reaction product when oligomerizing LAOs in the presence of a $BF_3$ catalyst system (<10% of total oligomers formed), the isomeric branched paraffin dimers obtained after distillation and hydrogenation offer surprisingly good heat transfer performance, as discussed further herein. Thus, isomeric branched paraffin dimers may be harvested from a reaction mixture following oligomerization of LAOs with a $BF_3$ catalyst system and hydrogenation for use in heat transfer applications, and higher branched paraffin oligomers may be utilized for other purposes. Indeed, isomeric branched paraffin dimers formed during oligomerization of LAOs with an acid catalyst system were heretofore viewed as an undesirable byproduct, and minimization of their formation during LAO oligomerization was sought. The present disclosure demonstrates new utility for these previously undesirable byproducts.

LAOs oligomerized with a $BF_3$ catalyst system bear hydrocarbyl branches at any position of the dimer backbone, and branches of variable sizes may be present. One branch or multiple branches may be present within a given dimer molecule. LAOs having about 8 to about 12 carbon atoms may be oligomerized to form isomeric branched paraffin dimers having about 16 to about 24 carbon atoms, which may afford a desirable combination of properties for thermal management applications, such as acceptably high flash points, low pour points, and cooling efficiency (approximated by the Mouromtseff Number at 80° C.), as discussed further below. Because of the inverse relationship between flash point and Mouromtseff Number, it has been difficult heretofore to identify heat transfer fluids exhibiting both a high Mouromtseff Number and flash point that is suitably high, particularly for heat transfer fluids providing low electrical conductivity. The isomeric branched paraffin dimers disclosed herein may be particularly advantageous in terms of their elevated flash points, which may meet or exceed the maximum operating temperature of currently used lithium-ion batteries. Heat transfer fluids of the present disclosure may feature flash points above about 140° C. and pour points lower than about −50° C. Blends of different isomeric branched paraffin dimers having total carbon counts in the foregoing range may be readily formulated as well in order to afford further tailoring of the flash point, pour point and/or cooling efficiency in some cases. Blends of isomeric branched paraffin dimers may be formed by combining isomeric branched paraffin dimers of different sizes post-synthesis, or by co-oligomerizing two different LAOs, as discussed further below. In addition, combining a small amount of higher branched paraffin oligomers, specifically less than 2.5 wt. % isomeric branched paraffin trimers, with the isomeric branched paraffin dimers may be advantageous in some cases, as discussed further below. Other components may be included in the heat transfer fluids of the present disclosure as well, as needed to modify the Mouromtseff Number, pour point, cooling efficiency, or other performance property needed for compatibility in a given application. As still another advantage, isomeric branched paraffins formed using a $BF_3$ catalyst system are usually highly pure and may be substantially absent of corrosion-causing ions, such as sulfur-based ions, which may be desirable for limiting damage to components in contact with the heat transfer fluid during thermal management applications. High thermal stability and chemical stability may also be realized within the heat transfer fluids described herein.

Heat transfer fluids containing predominantly isomeric $C_{20}$ branched paraffin dimers (formed by dimerization of a $C_{10}$ LAO in the presence of a $BF_3$ catalyst system, followed by hydrogenation) may be particularly advantageous with respect to their combination of high Mouromtseff Number, high flash point, low pour point, and negligible electrical conductivity. The combined properties of isomeric $C_{20}$ branched paraffin dimers may be particularly applicable for use in providing thermal management of various components in electric vehicles, especially electric vehicle batteries. For example, isomeric $C_{20}$ branched paraffin dimers formed by hydrogenating isomeric $C_{10}$ LAO dimers may have a flash point of about 155° C., which is substantially higher than the expected failure temperature of lithium-ion batteries currently in common use.

Isomeric branched paraffin dimers formed from LAOs in accordance with the disclosure herein exhibit Mouromtseff Numbers at 80° C. that are consistent with good heat transfer efficiency under operating conditions at this temperature. Mouromtseff Numbers measured at other temperatures may represent a more accurate measure of the heat transfer efficiency under other operating conditions. The Mouromtseff Number for a fluid at a given temperature is expressed by Equation 1, $$Mo = \frac{\rho^a k^b c_p^d}{\mu^e} \quad \text{Equation 1}$$

wherein Mo is the Mouromtseff Number, ρ is the fluid density, k is the thermal conductivity, $c^p$ is the specific heat, and μ is the dynamic viscosity of the fluid, and a, b, d and e are empirical values fit to the heat transfer mode of interest. In the case of internal turbulent flow applicable to electric vehicles, the Mouromtseff Number may be expressed by Equation 2, wherein the values of a, b, d and e are empirically determined for the turbulent flow regime.

$$Mo = \frac{\rho^{0.8} k^{0.67} c_p^{0.33}}{\mu^{0.47}} \quad \text{Equation 2}$$

The units for Mouromtseff Number under turbulent flow conditions, taking the exponents in Equation 2 into account, are $W \cdot s^{0.8}/(m^{2.6} \cdot K)$, which may be equivalently expressed as $kg/(s^{2.2} \cdot m^{0.6} \cdot K)$ in full SI units. All Mouromtseff Numbers expressed herein have these units. Relative Mouromtseff Numbers may be calculated by dividing the Mouromtseff Number by the Mouromtseff Number of water. FIG. 1 shows a plot of flash point versus Mouromtseff Number for various heat transfer fluids. Mouromtseff Numbers were calculated using Equation 2 for turbulent flow conditions. As shown, isomeric $C_{20}$ LAO dimers formed in accordance with the disclosure herein lie in a desirable region affording a combination of good heat transfer and flash point performance, comparable to values obtained for other types of heat transfer fluids. Isomeric branched paraffin dimers formed from LAOs having about 8 to about 12 carbon atoms may exhibit Mouromtseff Numbers at 80° C. ranging from about 10,000 to about 16,000 $kg/(s^{2.2} \cdot m^{0.6} \cdot K)$.

Although isomeric branched paraffin dimers alone may afford advantageous heat transfer performance, it has been found that the presence of a small amount of isomeric branched paraffin trimers in combination with the isomeric branched paraffin dimers may afford a surprising increase in clarity, particularly at low temperatures. Such optical clarity may be desirable in order to verify that the heat transfer fluid has not undesirably solidified or gelled, for example. The isomeric branched paraffin trimers may be incorporated in an amount up to about 2.5 wt. % based on total oligomers, although benefits may be seen at lower amounts, such as about 0.5-2 wt. %. When incorporated in such small amounts, the isomeric branched paraffin trimers do not appreciably impact the Mouromtseff Number, flash point, pour points, or other thermal management property.

In addition to their favorable flash points and Mouromtseff Numbers, which are particularly compatible with the operating temperature range for electric vehicles, isomeric branched paraffin dimers of the present disclosure are substantially electrically insulating. Therefore, the isomeric branched paraffin dimers disclosed herein may be particularly suitable heat transfer fluids for immersion or partial immersion of a battery or other electrical component to promote more effective heat transfer therefrom. Although the heat transfer fluids disclosed herein may be advantageous when used for immersive thermal management applications, it is to be appreciated that the heat transfer fluids may also be used in other manners as well, such as jacketed and/or circulating heat transfer applications, even though such approaches may be less effective for cooling. In addition, the heat transfer fluids disclosed herein may also be suitably used to promote cooling of the electric motor(s) or one or more electric motor components of an electric vehicle, thereby affording simplified operation compared to providing separate cooling systems for the battery and the motor of an electric vehicle. Direct cooling using the heat transfer fluids disclosed herein may also be applicable to electric vehicle fast-charging stations, which may promote battery charging over a span of about 4-5 minutes in non-limiting examples. Other heat-generating components in an electric vehicle, such as frictional heating of the vehicle's axles, for example, may also be addressed through application of the disclosure herein. In other aspects, the heat transfer fluids disclosed herein may provide advantageous benefits in applications such as, for example, server farms, data processing centers, high-power electronics, and 5G communication systems. As such, the present disclosure addresses numerous applications in which dissipation of excess heat may otherwise be problematic.

All numerical values within the detailed description and the claims herein are modified by "about" or "approximately" with respect to the indicated value, and take into account experimental error and variations that would be expected by a person having ordinary skill in the art. Unless otherwise indicated, ambient temperature (room temperature) is about 25° C.

As used in the present disclosure and claims, the singular forms "a," "an," and "the" include plural forms unless the context clearly dictates otherwise.

The term "and/or" as used in a phrase such as "A and/or B" herein is intended to include "A and B," "A or B," "A," and "B."

For the purposes of the present disclosure, the new numbering scheme for groups of the Periodic Table is used. In said numbering scheme, the groups (columns) are numbered sequentially from left to right from 1 through 18, excluding the f-block elements (lanthanides and actinides).

The term "hydrocarbon" refers to a class of compounds containing hydrogen bound to carbon, and encompasses (i) saturated hydrocarbon compounds, (ii) unsaturated hydrocarbon compounds, and (iii) mixtures of hydrocarbon compounds (saturated and/or unsaturated), including mixtures of hydrocarbon compounds having different numbers of carbon atoms. The term "Cn" refers to hydrocarbon(s) or a hydrocarbyl group having n carbon atom(s) per molecule or group, wherein n is a positive integer. Such hydrocarbon compounds may be one or more of linear, branched, cyclic, acyclic, saturated, unsaturated, aliphatic, or aromatic. Optional heteroatom substitution may be present in a hydrocarbon or hydrocarbyl group.

The terms "hydrocarbyl" and "hydrocarbyl group" are used interchangeably herein. The term "hydrocarbyl group" refers to any $C_1$-$C_{100}$ hydrocarbon group bearing at least one unfilled valence position when removed from a parent compound. Suitable hydrocarbyl groups may be cyclic or acyclic, branched or unbranched, and/or aliphatic or aromatic.

The term "alkyl" refers to a hydrocarbyl group having no unsaturated carbon-carbon bonds. Optional heteroatom substitution or branching may be present in an alkyl group, unless otherwise specified herein.

The term "alkenyl" refers to a hydrocarbyl group having a carbon-carbon double bond. The terms "alkene" and "olefin" are used synonymously herein. Similarly, the terms "alkenic" and "olefinic" are used synonymously herein. Unless otherwise noted, all possible geometric isomers are encompassed by these terms.

The terms "linear" and "linear hydrocarbon" refer to a hydrocarbon or hydrocarbyl group having a continuous carbon chain without substantial side chain branches.

The term "linear alpha olefin (LAO)" refers to an alkenic hydrocarbon bearing a carbon-carbon double bond at a terminal (end) carbon atom of the main carbon chain. Most often, no side chain branches are present in a LAO, although there may occasionally be a minor amount of branching component in a given LAO sample.

The terms "branch," "branched" and "branched hydrocarbon" refer to a hydrocarbon or hydrocarbyl group having a linear main carbon chain in which a hydrocarbyl side chain extends from the linear main carbon chain. The term "unbranched" refers to a straight-chain hydrocarbon or hydrocarbyl group without side chain groups extending therefrom.

LAOs, which also may be referred to as terminal olefins or terminal alkenes, may be isolated from a petroleum refinery stream. Alternatively, LAOs may be synthesized by several processes starting from low molecular weight feedstock materials, such as via oligomerization of ethylene or through byproduct isolation from the Fischer-Tropsch synthesis. LAOs are composed of a linear hydrocarbon chain, optionally with a minor amount of hydrocarbyl branching (e.g., one methyl or ethyl group per LAO molecule) in a small portion of a sample otherwise lacking branching, and have a chemical formula of $C_xH_{2x}$ (x is an integer greater than or equal to 3, particularly an even integer greater than or equal to 4) with a double bond between C-1 and C-2. As such, LAOs represent a versatile and inexpensive feedstock for forming LAO dimers and heat transfer fluids comprising isomeric branched paraffins, particularly isomeric branched paraffin dimers, produced according to the disclosure herein.

Heat transfer fluids of the present disclosure, which may be suitable for use in cooling batteries or other components of electric vehicles or in other applications in need of effective heat transfer, including the electric motor, power electronics or electric motor components of electric vehicles, may comprise a plurality of isomeric branched paraffins comprising a hydrogenated reaction product of one or more linear alpha olefins (LAOs) oligomerized with a $BF_3$ catalyst system, the plurality of isomeric branched paraffins comprising at least about 90 wt. % isomeric branched paraffin dimers. The one or more LAOs have about 8 to about 12 carbon atoms. The plurality of isomeric branched paraffins collectively have a Mouromtseff Number ranging from about 10,000 to about 16,000 $kg/(s^{2.2}\cdot m^{0.6}\cdot K)$ at 80° C., a thermal conductivity at 80° C. of about 0.125 W/m·K or higher, and a flash point of about 140° C. or higher. The term "collectively" means "in combination"

herein. Thus, isomeric branched paraffin dimers, optionally in combination with isomeric branched paraffin trimers and/or additional components, may exhibit a Mouromtseff Number, thermal conductivity, and flash point within the foregoing ranges according to the disclosure herein.

Isomeric branched paraffins may be formed by producing one or more LAO oligomers under acid-catalyzed oligomerization conditions (e.g., using a $BF_3$ catalyst system), hydrogenating, and separating isomeric branched paraffin dimers from higher oligomers. Optionally, LAO dimers may be separated from other LAO oligomers before hydrogenating to form the isomeric branched paraffin dimers. Homogeneous LAO oligomers may be formed by oligomerizing a single type of LAO (e.g., a $C_8$, $C_{10}$ or $C_{12}$ LAO) and hydrogenating to form isomeric branched paraffin dimers (e.g., $C_{16}$, $C_{20}$ or $C_{24}$ branched paraffin dimers having variable branch positions and lengths, respectively), trimers and higher oligomers. Heterogeneous branched paraffin dimers may be formed by dimerizing two LAOs having different chain lengths (e.g., $C_8$ and $C_{10}$, $C_8$ and $C_{12}$, or $C_{10}$ and $C_{12}$ LAOs) and hydrogenating to afford $C_{18}$. $C_{20}$ or $C_{22}$ isomeric branched paraffin dimers, respectively). When two or more LAOs of different chain lengths are simultaneously dimerized, a statistical mixture of both homogeneous and heterogeneous LAO dimers and higher oligomers of all possible carbon atom counts may be obtained. For example, dimerization of $C_8$ and $C_{10}$ LAOs may afford isomeric $C_{16}$, $C_{18}$ and $C_{20}$ as a statistical mixture, as well as trimers and higher oligomers formed from each type of LAO or a combination thereof. The actual product distribution that is obtained may depend upon the relative molar amounts of each type of LAO undergoing dimerization and their relative rates of reaction. Subsequent hydrogenation may afford the corresponding isomeric branched paraffins in a similar statistical distribution. Isomeric branched paraffins or a subset of isomeric branched paraffins obtained following hydrogenation may be isolated for use in heat transfer fluids according to the disclosure herein. Mixtures of isomeric branched paraffin dimers and other components, including higher isomeric branched paraffin oligomers obtained from hydrogenation, may be employed if the flash point, Mouromtseff Number, or other property of a given sample of isomeric branched paraffin dimer is insufficient for a particular application. As a non-limiting example, isomeric branched paraffin trimers may be present in a heat transfer fluid comprising predominantly isomeric branched paraffin dimers to afford improved clarity, as discussed further below.

$C_{16}$-$C_{24}$ isomeric branched paraffin dimers may be synthesized by oligomerizing $C_8$-$C_{12}$ LAOs in the presence of a $BF_3$ catalyst system or a similar acid catalyst, hydrogenating and separating a cut comprising isomeric branched paraffin dimers. It is to be appreciated that similar isomeric branched paraffin dimers in the foregoing $C_{16}$-$C_{24}$ range may be prepared by dimerizing LAOs having carbon counts above and below the $C_8$-$C_{12}$ range, but formation of the isomeric branched paraffin dimers in this manner may be accompanied by undesirable formation of heavy and light species.

The isomeric branched paraffin dimers formed according to the present disclosure are distinguishable from counterpart branched paraffin dimers formed through other oligomerization techniques, such as metallocene-catalyzed oligomerization and subsequent hydrogenation. Metallocene-catalyzed oligomerization of LAOs leads to one or a very limited number of branched paraffin dimers, since no alkyl group migration occurs during metallocene-catalyzed oligomerization. In addition, commercial sources of LAOs may contain a small amount of branched and internal olefins. All of these species may undergo oligomerization when using a $BF_3$ catalyst system or a similar acid catalyst. Under metallocene-catalyzed oligomerization conditions, in contrast, internal olefins and branched olefins may be much more resistant toward undergoing oligomerization, if they react at all. Thus, the heat transfer fluids of the present disclosure are believed to contain at least some isomeric branched paraffin dimers that are not obtained via metallocene-catalyzed oligomerization and subsequent hydrogenation.

In more particular embodiments, heat transfer fluids of the present disclosure may comprise at least about 90 wt. % of the isomeric branched paraffins. As discussed herein, $C_{20}$ isomeric branched paraffin dimers may be particularly suitable for use in the heat transfer fluids of the present disclosure. Thus, at least $C_{20}$ isomeric branched paraffin dimers obtained from a $C_{10}$ LAO may be present in particular heat transfer fluids. More specific heat transfer fluids of the present disclosure may comprise at least about 90 wt. % of isomeric branched paraffin dimers formed from a $C_{10}$ LAO (i.e., a plurality of isomeric $C_{20}$ branched paraffin dimers). In other particular embodiments, the heat transfer fluids may comprise at least about 95 wt. % of isomeric $C_{20}$ branched paraffin dimers, or at least about 98 wt. % of isomeric $C_{20}$ branched paraffin dimers, with other isomeric $C_{16}$-$C_{24}$ branched paraffin dimers and/or other components making up the balance of the heat transfer fluids. The plurality of isomeric branched paraffins in certain heat transfer fluids may comprise predominantly (e.g., >92 wt. %) isomeric $C_{20}$ branched paraffin dimers, in combination with a non-zero amount of isomeric $C_{16}$, $C_{18}$, $C_{22}$ and/or $C_{24}$ isomeric branched paraffin dimers, up to about 2 wt. % of each. In still more specific examples, the isomeric branched paraffins may consist essentially of isomeric $C_{20}$ branched paraffin dimers.

Branched paraffins formed from LAO oligomers that are higher than dimers (e.g., trimers, tetramers, pentamers, and higher oligomers) may afford an insufficient value for one or more of Mouromtseff Number, thermal conductivity, pour point and flash point suitable for forming a suitable heat transfer fluid. Unexpectedly, including a small amount of isomeric branched paraffin trimers formed from LAOs (e.g., isomeric branched paraffin trimers formed from 1-decene under promotion of a $BF_3$ catalyst system) may have a surprising effect on the clarity of heat transfer fluids comprising predominantly isomeric branched paraffin dimers without overly impacting the Mouromtseff Number, thermal conductivity, pour point or flash point. Heat transfer fluids of the present disclosure may comprise about 2.5 wt. % or less of isomeric branched paraffin trimers, or about 2 wt. % or less of isomeric branched paraffin trimers, such as about 0.5 wt. % to about 2 wt. % of isomeric branched paraffin trimers, as measured relative to total oligomers present in the heat transfer fluids. In specific examples, isomeric $C_{20}$ branched paraffin trimers prepared from $C_{10}$ LAOs may be present in an amount ranging from about 0.5 wt. % to about 2 wt. %, or about 0.7 wt. % to about 2 wt. %, or about 1 wt. % to about 2 wt. %.

LAOs may form LAO oligomers having branches in a range of locations upon the oligomer carbon chain and in varying oligomer sizes in the presence of an acid catalyst system, such as $AlCl_3$, $BF_3$ or $BF_3$ complex and a suitable set of promoters, as described in further detail hereinafter. $BF_3$ catalyst systems may represent a particularly suitable acid catalyst system for producing branched LAO oligomers in the disclosure herein. Dimers, trimers, tetramers and higher LAO oligomers may be formed in the presence of $BF_3$ and suitable promoters, with trimers and tetramers being produced in higher amounts than are dimers, as described in U.S. Patent Application Publication 2006/0211904, which is incorporated herein by reference. Other suitable conditions for forming LAO oligomers in the presence of $BF_3$ catalyst systems may be found in U.S. Pat. Nos. 3,382,291, 5,068,487, and 6,075,174, also incorporated herein by reference in their entirety. Following hydrogenation, the corresponding isomeric branched paraffins may be produced, and the minor product isomeric branched paraffin dimers may then be separated for use within a heat transfer fluid according to the disclosure herein.

$BF_3$ catalyst systems suitable for oligomerizing LAOs may comprise $BF_3$ and at least two different promoters, specifically at least one alcohol promoter and at least one ester promoter. Without being limited by theory or mechanism, the at least one ester promoter is believed to promote chain termination during oligomerization. $BF_3$ gas is preferably introduced into the reactor simultaneously with the at least two different promoters and olefin feed. The at least two different promoters and/or the reaction mixture may be saturated with $BF_3$, such that the $BF_3$ is maintained in the head space of a reactor at a pressure of about 2 psig to about 50 psig, preferably about 2 psig to about 10 psig. The alcohol promoter may be selected from $C_1$ to $C_{10}$ alcohols or $C_1$ to $C_6$ alcohols. The alcohols may be straight-chain or branched alcohols, such as methanol, ethanol, n-propanol, n-butanol, n-pentanol, n-hexanol, or any combination thereof. The ester promoter used in combination with the alcohol promoter may be selected from the reaction product(s) of an alcohol and an acid. Suitable alcohols for forming the ester promoter may include those suitable for alcohol promoters (i.e., $C_1$ to $C_{10}$ alcohols or $C_1$ to $C_6$ alcohols), as discussed above. The alcohol promoter and an alcohol portion of the ester promoter may comprise the same alcohol or a different alcohol. The acid portion of the ester promoter may be a monobasic carboxylic acid such as formic acid, acetic acid, propionic acid, or the like, with acetic acid being particularly desirable. The ratio of the alcohol promoter to ester promoter may range from about 0.2:1 to about 15:1 on a molar basis or about 0.5:1 to about 7:1 on a molar basis. More preferably, the ratio of alcohol promoter to ester promoter may be about 1:1 to about 1:3 on a molar basis, most preferably about 1.7:1 to about 2.3:1 on a molar basis. $BF_3$ is a gas and is usually fed in excess, such as at a pressure of about 5 psig.

Suitable temperatures for forming the LAO oligomers using a $BF_3$ catalyst system may range from about 0° C. to about 50° C., or about 15° C. to about 35° C., or about 20° C. to about 30° C., or about 20° C. to about 24° C.

Schemes 1-3 below provide reaction schemes and illustrative structures for branched LAO dimers and branched paraffin dimers produced therefrom according to the disclosure herein. Since the oligomerization reactions disclosed herein may occur with double bond migration, it is to be appreciated that the branching location and the size of the branch(es) may differ from those depicted expressly in the Schemes (e.g., at a deeper position within the hydrocarbyl chain). By way of non-limiting example and without being limited by any particular theory, the dimer in Scheme 1 may occur through carbocation formation at the allylic position followed by addition of the terminal alkene carbon of a second LAO molecule to the allylic carbocation. In Scheme 2, dimerization may occur similarly by way of formation of a secondary carbocation, again producing a monobranched dimer in a different position of the carbon chain. In Scheme 3, a benzylic carbocation may react at C-2 of a second LAO molecule to afford a dibranched paraffin dimer.

Scheme 1

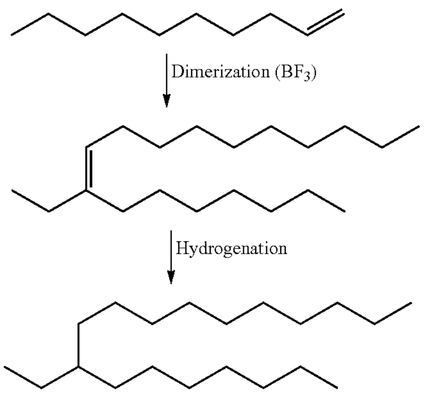

Scheme 2

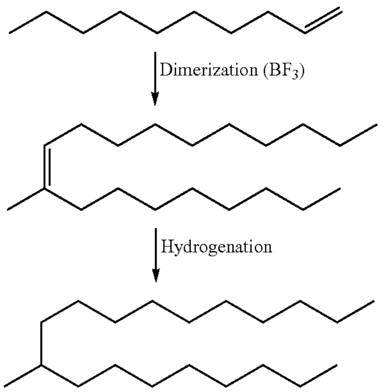

Scheme 3

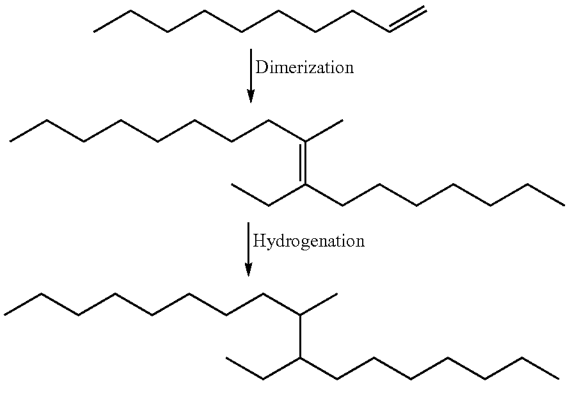

Hydrogenation of the LAO dimers to afford isomeric branched paraffin dimers may be carried out in a slurry or fixed bed reactor system using a variety of Ni, Pt or Pd hydrogenation catalysts. Ni catalysts may be optionally sulfided. Suitable hydrogenation conditions, hydrogenation catalysts, reactors and the like will be familiar to one having ordinary skill in the art. In non-limiting embodiments, hydrogenation may be performed under a pressure of about 100 psi to about 300 psi, and a temperature of about 200° C. to about 300° C.

The heat transfer fluids described herein may be particularly compatible for incorporation in an electric vehicle. Accordingly, electric vehicles disclosed herein may comprise a heat-generating component, and a heat transfer fluid in contact with the heat-generating component. Any of the heat transfer fluids specified above may be present in the electric vehicles specified herein. The heat transfer fluids specified above may also be present in battery systems and thermal management systems, and may be incorporated in thermal management methods, as further specified herein.

Additional components may be included in the heat transfer fluids disclosed herein. Among the additional components that may be present in the heat transfer fluids to address particular application-specific needs include, for example, base oils, aromatic hydrocarbons, polyalphaolefins, paraffins, esters, ethers, gas-to-liquids base oils, Fischer-Tropsch wax-derived base oils, wax-derived hydroisomerized base oils, silicone oils, antioxidants, corrosion inhibitors, antifoam agents, antiwear agents, dispersants, detergents, viscosity modifiers, and any combination thereof. Suitable examples of additional components that may be present are discussed hereinafter.

A wide range of heat transfer fluid base oils is known in the art. Heat transfer fluid base oils that may be useful in the present disclosure include natural oils, mineral oils and synthetic oils, and unconventional oils (or mixtures thereof), any of which can be used unrefined, refined, or rerefined, the latter being also known as reclaimed or reprocessed oil. Unrefined oils include those obtained directly from a natural or synthetic source and used without added purification. These include shale oil obtained directly from retorting operations, petroleum oil obtained directly from primary distillation, and ester oil obtained directly from an esterification process. Refined oils are similar to the oils discussed for unrefined oils except refined oils are subjected to one or more purification steps to improve at least one heat transfer fluid base oil property. One skilled in the art will be familiar with many purification processes. Such purification processes may include solvent extraction, secondary distillation, acid extraction, base extraction, filtration, percolation, and any combination thereof. Rerefined oils are obtained by processes analogous to refined oils but using an oil that has been previously used as a feed stock.

Groups I, II, III, IV and V are broad base oil stock categories developed and defined by the American Petroleum Institute (API Publication 1509; www.API.org) to create guidelines for heat transfer fluid base oils. Group I base stocks have a viscosity index of between about 80 to 120 and contain greater than about 0.03% sulfur and/or less than about 90% saturates. Group II base stocks have a viscosity index of between about 80 to 120, and contain less than or equal to about 0.03% sulfur and greater than or equal to about 90% saturates. Group III base stocks have a viscosity index greater than about 120 and contain less than or equal to about 0.03% sulfur and greater than about 90% saturates. Group IV base stocks includes polyalphaolefins (PAOs). Group V base stocks includes base stocks not included in Groups I-IV. Table 1 below summarizes properties of each of these five groups.

TABLE 1

| | Base Oil Properties | | |
|---|---|---|---|
| | Saturates | Sulfur | Viscosity Index |
| Group I | <90 and/or | >0.03% and | ≥80 and <120 |
| Group II | ≥90 and | ≤0.03% and | ≥80 and <120 |
| Group III | ≥90 and | ≤0.03% and | ≥120 |

TABLE 1-continued

| | Base Oil Properties | | |
|---|---|---|---|
| | Saturates | Sulfur | Viscosity Index |
| Group IV | polyalphaolefins (PAOs) | | |
| Group V | All other base oil stocks not included in Groups I, II, III or IV | | |

Natural oils include animal oils, vegetable oils (castor oil and lard oil, for example), and mineral oils. Animal and vegetable oils possessing favorable thermal oxidative stability can be used. Of the natural oils, mineral oils are preferred. Mineral oils vary widely as to their crude source, for example, as to whether they are paraffinic, naphthenic, or mixed paraffinic-naphthenic. Oils derived from coal or shale may also be useful. Natural oils also may vary as to the method used for their production and purification, for example, their distillation range and whether they are straight run or cracked, hydrorefined, or solvent extracted.

Group II and/or Group III hydroprocessed or hydrocracked base stocks, including synthetic oils such as alkyl aromatics and synthetic esters are also well known base stock oils that may be used in the disclosure herein.

Synthetic oils include hydrocarbon oil. Hydrocarbon oils include oils such as polymerized and interpolymerized olefins (polybutylenes, polypropylenes, propylene isobutylene copolymers, ethylene-olefin copolymers, and ethylene-alphaolefin copolymers, for example). Polyalphaolefin (PAO) oil base stocks are commonly used synthetic hydrocarbon oil. By way of example, PAOs derived from $C_8$, $C_{10}$, $C_{12}$, or $C_{14}$ olefins or mixtures thereof may be utilized, as described in U.S. Pat. Nos. 4,956,122; 4,827,064; and 4,827,073, each of which is incorporated herein by reference.

Other useful heat transfer fluid oil base stocks include wax isomerate base stocks and base oils, comprising hydroisomerized waxy stocks (e.g., waxy stocks such as gas oils, slack waxes, fuels hydrocracker bottoms, and the like), hydroisomerized Fischer-Tropsch waxes, gas-to-liquids (GTL) base stocks and base oils, and other wax isomerate hydroisomerized base stocks and base oils, or mixtures thereof. Fischer-Tropsch waxes, the high boiling point residues of a Fischer-Tropsch synthesis, are highly paraffinic hydrocarbons with very low sulfur content. The hydroprocessing used for the production of such base stocks may use an amorphous hydrocracking/hydroisomerization catalyst, such as one of the specialized lube hydrocracking (LHDC) catalysts or a crystalline hydrocracking/hydroisomerization catalyst, preferably a zeolitic catalyst.

Gas-to-liquids (GTL) base oils, Fischer-Tropsch wax-derived base oils, and other wax-derived hydroisomerized (wax isomerate) base oils may be advantageously used in the present disclosure, and may have useful kinematic viscosities at 100° C. of about 3 cSt to about 50 cSt, preferably about 3 cSt to about 30 cSt, more preferably about 3.5 cSt to about 25 cSt, as exemplified by GTL 4 with kinematic viscosity of about 4.0 cSt at 100° C. and a viscosity index of about 141. These gas-to-liquids (GTL) base oils, Fischer-Tropsch wax-derived base oils, and other wax-derived hydroisomerized base oils may have useful pour points of about-20° C. or lower, and under some conditions may have advantageous pour points of about −25° C. or lower, with useful pour points of about −30° C. to about −40° C. or lower. Useful compositions of gas-to-liquids (GTL) base oils, Fischer-Tropsch wax-derived base oils, and wax-derived hydroisomerized base oils are recited in U.S. Pat. Nos. 6,080,301; 6,090,989; and 6,165,949, for example, and are incorporated herein in their entirety by reference.

Esters may comprise a useful base stock. Additive solvency and seal compatibility characteristics may be secured by the use of esters such as the esters of dibasic acids with monoalkanols and the polyol esters of monocarboxylic acids. Esters of the former type include, for example, the esters of dicarboxylic acids such as phthalic acid, succinic acid, alkyl succinic acid, alkenyl succinic acid, maleic acid, azelaic acid, suberic acid, sebacic acid, fumaric acid, adipic acid, linoleic acid dimer, malonic acid, alkyl malonic acid, alkenyl malonic acid, and the like, with a variety of alcohols such as butyl alcohol, hexyl alcohol, dodecyl alcohol, 2-ethylhexyl alcohol, and the like. Specific examples of these types of esters include dibutyl adipate, di-(2-ethylhexyl) sebacate, di-n-hexyl fumarate, dioctyl sebacate, diisooctyl azelate, diisodecyl azelate, dioctyl phthalate, didecyl phthalate, dieicosyl sebacate, and the like.

Base oils suitable for use in heat transfer fluids useful in the present disclosure may include any of the variety of oils corresponding to API Group I, Group II, Group III, Group IV, and Group V oils, and mixtures thereof, preferably API Group II, Group III, Group IV, and Group V oils, and mixtures thereof, more preferably Group III, Group IV, and Group V base oils, and mixtures thereof. Highly paraffinic base oils can be used to advantage in heat transfer fluids useful in the present disclosure. Minor quantities of Group I base stock, such as the amount used to dilute additives for blending into formulated lube oil products, can also be used. Even in regard to the Group II stocks, it is preferred that the Group II stock be in the higher quality range associated with that stock, such as a Group II base stock having a viscosity index in the range 100<VI<120.

The base oil may constitute a minor or major component of the heat transfer fluids of the present disclosure and may be present in an amount ranging from about 50 to about 99 wt. %, preferably from about 70 to about 95 wt. %, and more preferably from about 85 to about 95 wt. %, based on the total weight of the composition, or the base oil may be present in an amount of about 10 wt. % or below. The base oil conveniently has a kinematic viscosity, according to ASTM standards, of about 2.5 cSt to about 12 cSt (or mm2/s) at 100° C. and preferably of about 2.5 cSt to about 9 cSt (or mm2/s) at 100° C. Mixtures of synthetic and natural base oils may be used if desired. Bi-modal mixtures of Group I, II, III, IV, and/or V base stocks may be used, if desired.

The heat transfer fluids useful in the present disclosure may additionally contain one or more commonly used heat transfer fluid performance additives including but not limited to antioxidants, corrosion inhibitors, antifoam agents, and others. These additives are commonly delivered with varying amounts of diluent oil, which may range from 5 wt. % to 50 wt. % of the heat transfer fluid, or about 10 wt. % or below of the heat transfer fluid. The additives useful in this disclosure do not have to be soluble in the heat transfer fluids. The types and quantities of performance additives used in the heat transfer fluids of the present disclosure are not limited by the examples shown herein as illustrations.

The heat transfer fluids may include at least one antioxidant. Antioxidants retard the oxidative degradation of fluids during service. Such degradation may result in deposits on metal surfaces, the presence of sludge, or a viscosity increase in the heat transfer fluid. One having ordinary skill in the art will appreciate that a wide variety of oxidation inhibitors may be useful in heat transfer fluids. See, Klamann in Lubricants and Related Products, Verlag Chemie, Deerfield Beach, FL; ISBN 0-89573-177-0, and U.S. Pat. Nos. 4,798,684 and 5,084,197, for example. Particular examples of the heat transfer fluids may comprise at least two different antioxidants, preferably at least one phenol-based antioxidant and at least one amine-based antioxidant. The presence of both types of antioxidant in combination may afford lower viscosity values and better oxidation performance compared to either type of antioxidant alone, thereby providing more stable heat transfer performance over a longer period of time. An amount of the at least one phenol-based antioxidant may be about 0.25 wt. % or above, or about 0.5 wt. % or above, preferably ranging from about 0.25 wt. % to about 5 wt. %, or about 0.5 wt. % to about 4 wt. %, or about 0.75 wt. % to about 3 wt. %, or about 1 wt. % to about 2.5 wt. %, or about 0.75 wt. % to about 2.25 wt. %. An amount of the at least one amine-based antioxidant may be about 0.1 wt. % or above or about 0.2 wt. % or above, preferably ranging from about 0.1 wt. % to about 1 wt. %, or about 0.2 wt. % to about 0.9 wt. %, or about 0.25 wt. % to about 0.75 wt. %. In non-limiting examples, the at least one phenol-based oxidant may be present in excess by weight percentage, preferably at least about a 2:1 excess of the at least one phenol-based oxidant relative to the at least one amine-based oxidant. Particular examples of suitable heat transfer fluids may comprise at least about 0.25 wt. % of the at least one phenol-based antioxidant and at least about 0.1 wt. % of the at least one amine-based antioxidant, or at least about 0.5 wt. % of the at least one phenol-based antioxidant and at least about 0.2 wt. % of the at least one amine-based antioxidant.

The heat transfer fluids may include at least one corrosion inhibitor. Corrosion inhibitors are used to reduce the degradation of metallic parts that are in contact with the heat transfer fluids. Corrosion inhibitors are additives that protect metal surfaces against chemical attack by water or other contaminants. A wide variety of corrosion inhibitors are commercially available. As used herein, corrosion inhibitors include antirust additives and metal deactivators. Suitable corrosion inhibitors also include aryl thiazines, alkyl substituted dimercaptothiodiazoles, alkyl substituted dimercaptothiadiazoles, and mixtures thereof.

One type of suitable corrosion inhibitor is a polar compound that wets the metal surface preferentially, protecting it with a film of oil. Another type of corrosion inhibitor absorbs water by incorporating it in a water-in-oil emulsion so that only the oil touches the metal surface. Yet another type of corrosion inhibitor chemically adheres to the metal to produce a non-reactive surface. Examples of suitable additives include zinc dithiophosphates, metal phenolates, basic metal sulfonates, fatty acids and amines. Such additives may be used in an amount of about 0.01 wt. % to 5 wt. %, preferably about 0.01 to 1.5 wt. %, more preferably 0.01 to 0.2 wt. %, still more preferably 0.01 to 0.1 wt. % (on an as-received basis) based on the total weight of the heat transfer fluid.

Antifoam agents may advantageously be added to heat transfer fluids. These agents retard the formation of stable foams. Silicones and organic polymers are typical antifoam agents. For example, polysiloxanes, such as silicon oil or polydimethylsiloxane, provide antifoam properties. Antifoam agents are commercially available and may be used in conventional minor amounts along with other additives such as demulsifiers; usually the amount of these additives combined is less than 1 wt. % and often less than 0.1 wt. %. In an embodiment, such additives may be used in an amount of about 0.01 to 5 wt. %, preferably 0.1 to 3 wt. %, and more preferably about 0.5 to 1.5 wt. %.

The heat transfer fluids may include at least one antiwear agent. Examples of suitable antiwear agents include oil soluble amine salts of phosphorus compounds, sulphurized olefins, metal dihydrocarbyldithio-phosphates (such as zinc dialkyldithiophosphates), thiocarbamate-containing compounds, such as thiocarbamate esters, thiocarbamate amides, thiocarbamic ethers, alkylene-coupled thiocarbamates, and bis(S-alkyldithiocarbamyl) disulphides.

Antiwear agents used in the heat transfer fluids may be ashless or ash-forming in nature. Preferably, the antiwear agent is ashless. So-called ashless antiwear agents are materials that form substantially no ash upon combustion. For example, non-metal-containing antiwear agents are considered ashless.

The heat transfer fluids of the present disclosure may additionally contain one or more of the other commonly used heat transfer fluid performance additives including but not limited to dispersants, detergents, viscosity modifiers, metal passivators, ionic liquids, extreme pressure additives, anti-seizure agents, wax modifiers, fluid-loss additives, seal compatibility agents, lubricity agents, anti-staining agents, chromophoric agents, defoamants, demulsifiers, emulsifiers, densifiers, wetting agents, gelling agents, tackiness agents, colorants, and others. For a review of many commonly used additives, see Klamann in Lubricants and Related Products, Verlag Chemie, Deerfield Beach, FL; ISBN 0-89573-177-0; see also U.S. Pat. No. 7,704,930, the disclosure of which is incorporated herein by reference in its entirety. These additives are commonly delivered with varying amounts of diluent oil, which may range from 5 wt. % to 50 wt. %.

The heat transfer fluids may include at least one dispersant. During electrical apparatus component operation, oil-insoluble oxidation byproducts are produced. Dispersants help keep these byproducts in solution, thus diminishing their deposition on metal surfaces. Dispersants used in the formulation of the heat transfer fluids may be ashless or ash-forming in nature. Preferably, the dispersant is ashless. So called ashless dispersants are organic materials that form substantially no ash upon combustion. For example, non-metal-containing or borated metal-free dispersants are considered ashless.

Suitable dispersants typically contain a polar group attached to a relatively high molecular weight hydrocarbon chain. The polar group typically contains at least one element of nitrogen, oxygen, or phosphorus. Typical hydrocarbon chains contain 50 to 400 carbon atoms.

The heat transfer fluids may include at least one detergent. Illustrative detergents useful in this disclosure include, for example, alkali metal detergents, alkaline earth metal detergents, or mixtures of one or more alkali metal detergents and one or more alkaline earth metal detergents. A typical detergent is an anionic material that contains a long chain hydrophobic portion of the molecule and a smaller anionic or oleophobic hydrophilic portion of the molecule. The anionic portion of the detergent is typically derived from an organic acid such as a sulfur acid, carboxylic acid (e.g., salicylic acid), phosphorous acid, phenol, or mixtures thereof. The counterion is typically an alkaline earth or alkali metal.

Viscosity modifiers (also known as viscosity index improvers (VI improvers), and viscosity improvers) can be included in the heat transfer fluids of this disclosure. Viscosity modifiers provide heat transfer fluids with high and low temperature operability. These additives impart shear stability at elevated temperatures and acceptable viscosity at low temperatures. Suitable viscosity modifiers include high molecular weight hydrocarbons, polyesters and viscosity modifier dispersants that function as both a viscosity modifier and a dispersant. Typical molecular weights of these polymers are about 10,000 to 1,500,000, more typically about 20,000 to 1,200,000, and even more typically between about 50,000 and 1,000,000.

Examples of suitable viscosity modifiers include linear or star-shaped polymers and copolymers of methacrylate, butadiene, olefins, or alkylated styrenes. Polyisobutylene is a commonly used viscosity modifier. Another suitable viscosity modifier is polymethacrylate (copolymers of various chain length alkyl methacrylates, for example), some formulations of which also serve as pour point depressants. Other suitable viscosity modifiers include copolymers of ethylene and propylene, hydrogenated block copolymers of styrene and isoprene, and polyacrylates (copolymers of various chain length acrylates, for example). Specific examples include styrene-isoprene or styrene-butadiene based polymers of 50,000 to 200,000 molecular weight.

The heat transfer fluids may include at least one metal passivator. The metal passivators/deactivators include, for example, benzotriazole, tolyltriazole, 2-mercaptobenzothiazole, dialkyl-2,5-dimercapto-1,3,4-thiadiazole; N,N'-disalicylideneethylenediamine, N,N'-disalicylidenepropylenediamine; zinc dialkyldithiophosphates and dialkyl dithiocarbamates. The metal passivator concentration in the heat transfer fluids of this disclosure can range from about 0.01 to about 5.0 wt. %, preferably about 0.01 to 3.0 wt. %, and more preferably from about 0.01 wt. % to about 1.5 wt. %, based on the total weight of the heat transfer fluid.

Ionic liquids are so-called salt melts, which are preferably liquid at room temperature and/or by definition have a melting point less than 100° C. They have almost no vapor pressure and therefore have no cavitation properties. In addition, through the choice of the cations and anions in the ionic liquids, the lifetime of the heat transfer fluid may be increased, and by adjusting the electric conductivity, these liquids can be used in equipment in which there is an electric charge buildup, such as electric vehicle components. Suitable cations for ionic liquids include a quaternary ammonium cation, a phosphonium cation, an imidazolium cation, a pyridinium cation, a pyrazolium cation, an oxazolium cation, a pyrrolidinium cation, a piperidinium cation, a thiazolium cation, a guanidinium cation, a morpholinium cation, a trialkylsulfonium cation or a triazolium cation In electrical apparatus components, static electricity is generated, especially when the heat transfer fluid is in use. To reduce that hazard, a conductive antistatic additive can be added to and distributed throughout the heat transfer fluids. The heat transfer fluid will thereby avoid reduction in its performance associated with local breakdown of the base stock and safety problems from static electric build-up.

A class of products called “antistatic fluids” or “antistatic additives,” which also are petroleum distillates, can be added to adjust the conductivity of heat transfer fluids to safe levels, such as at or above 100 pico-siemens per meter conductivity. Very small quantities of these antistatic fluids are required to raise the conductivity to the desired levels, such as 10 to 30 milliliters per 1,000 gallons of hydrocarbon.

Conventional pour point depressants (also known as lube oil flow improvers) may be added to the heat transfer fluids of the present disclosure. Pour point depressants may be added to heat transfer fluids of the present disclosure to lower the minimum temperature at which the fluid will flow or can be poured. Examples of suitable pour point depressants include polymethacrylates, polyacrylates, polyarylamides, condensation products of haloparaffin waxes and aromatic compounds, vinyl carboxylate polymers, and terpolymers of dialkylfumarates, vinyl esters of fatty acids and allyl vinyl ethers. U.S. Pat. Nos. 1,815,022; 2,015,748;

2,191,498; 2,387,501; 2,655,479; 2,666,746; 2,721,877; 2,721,878; and 3,250,715, each of which is incorporated herein by reference, describe useful pour point depressants and/or the preparation thereof. Such additives may be used in an amount of about 0.01 to 5 wt. %, preferably 0.1 to 3 wt. %, and more preferably about 0.5 to 1.5 wt. %.

The heat transfer fluids can include at least one seal compatibility agent. Seal compatibility agents help to swell elastomeric seals by causing a chemical reaction in the fluid or physical change in the elastomer. Suitable seal compatibility agents for heat transfer fluids include organic phosphates, aromatic esters, aromatic hydrocarbons, esters (butylbenzyl phthalate, for example), and polybutenyl succinic anhydride. Such additives may be used in an amount of about 0.01 to 5 wt. %, preferably 0.1 to 3 wt. %, and more preferably about 0.5 to 1.5 wt. %.

The heat transfer fluids can include at least one friction modifier. A friction modifier is any material or materials that can alter the coefficient of friction of a surface. Friction modifiers, also known as friction reducers, or lubricity agents or oiliness agents, and other such agents that change the ability of base oils, formulated heat transfer fluids, or functional fluids, to modify the coefficient of friction of a surface may be effectively used in combination with the base oils or heat transfer fluids of the present disclosure if desired. Friction modifiers that lower the coefficient of friction are particularly advantageous in combination with the base oils and heat transfer fluids of this disclosure.

Illustrative friction modifiers may include, for example, organometallic compounds or materials, or mixtures thereof. Illustrative organometallic friction modifiers useful in the heat transfer fluids of this disclosure include, for example, molybdenum amine, molybdenum diamine, an organotungstenate, a molybdenum dithiocarbamate, molybdenum dithiophosphates, molybdenum amine complexes, molybdenum carboxylates, the like, and mixtures thereof. Similar tungsten-based compounds may be preferable.

Other illustrative friction modifiers useful in the heat transfer fluids of this disclosure include, for example, alkoxylated fatty acid esters, alkanolamides, polyol fatty acid esters, borated glycerol fatty acid esters, fatty alcohol ethers, and mixtures thereof.

The heat transfer fluids can include at least one extreme pressure agent (EP). EP agents that are soluble in the oil include sulphur- and chlorosulphur-containing EP agents, chlorinated hydrocarbon EP agents and phosphorus EP agents. Examples of such EP agents include chlorinated wax; sulphurised olefins (such as sulphurised isobutylene), organic sulphides and polysulphides such as dibenzyldisulphide, bis-(chlorobenzyl)disulphide, dibutyl tetrasulphide, sulphurised methyl ester of oleic acid, sulphurised alkylphenol, sulphurised dipentene, sulphurised terpene, and sulphurised Diels-Alder adducts; phosphosulphurised hydrocarbons such as the reaction product of phosphorus sulphide with turpentine or methyl oleate; phosphorus esters such as the dihydrocarbon and trihydrocarbon phosphites, including dibutyl phosphite, diheptyl phosphite, dicyclohexyl phosphite, pentylphenyl phosphite; dipentylphenyl phosphite, tridecyl phosphite, distearyl phosphite and polypropylene substituted phenol phosphite; metal thiocarbamates such as zinc dioctyldithiocarbamate and barium heptylphenol diacid; amine salts of alkyl and dialkylphosphoric acids or derivatives; and mixtures thereof (as described in U.S. Pat. No. 3,197,405, which is incorporated herein by reference).

Extreme pressure agents may be used in an amount of about 0.01 to 5 wt. %, preferably 0.01 to 1.5 wt. %, more preferably 0.01 to 0.2 wt. %, and still more preferably 0.01 to 0.1 wt. % (on an as-received basis) based on the total weight of the heat transfer fluids.

When heat transfer fluids contain one or more of the additives discussed above, the additive(s) are blended into the heat transfer fluids in an amount sufficient for the heat transfer fluid and the additive to perform an intended function. Typical amounts of such additives useful in the present disclosure are shown in Table 2 below.

It is noted that many of the additives are shipped from the additive manufacturer as a concentrate, containing one or more additives together, with a certain amount of base oil diluent(s). Accordingly, the weight amounts in the Table 2 below, as well as other amounts mentioned herein, are directed to the amount of active ingredient (that is the non-diluent portion of the ingredient). The wt. % values indicated below are based on the total weight of the heat transfer fluids.

TABLE 2

| Compound | Approximate Wt. % (Useful) | Approximate Wt. % (Preferred) |
|---|---|---|
| Antioxidant | 0.01-5 | 0.1-1.5 |
| Corrosion Inhibitor | 0.01-5 | 0.1-2 |
| Antifoam Agent | 0-3 | 0.001-0.15 |
| Metal Passivator | 0.01-5 | 0.01-1.5 |
| Pour Point Depressant | 0.01-5 | 0.5-1.5 |
| Seal Compatibility Agent | 0.01-5 | 0.5-1.5 |
| Extreme Pressure Agent | 0.01-5 | 0.01-0.1 |

The foregoing additives are all commercially available materials. These additives may be added independently but also may be precombined in packages which can be obtained from suppliers of heat transfer fluid additives. Additive packages having a variety of ingredients, proportions and characteristics are available and selection of an appropriate package will take the requisite use of the ultimate heat transfer fluid into account.

Electric vehicles of the present disclosure may comprise any of the heat transfer fluids described further herein. As discussed above, the heat transfer fluids may comprise at least about 90 wt. % isomeric branched paraffin dimers in particular embodiments. At least isomeric $C_{20}$ branched paraffin dimers may be present in the heat transfer fluids in still more particular embodiments. In yet still more specific embodiments, the heat transfer fluids may comprise at least about 90 wt. % isomeric $C_{20}$ branched paraffin dimers or at least about 95 wt. % isomeric $C_{20}$ branched paraffin dimers. The heat transfer fluids may further comprise at about 2.5 wt. % or less of isomeric branched paraffin trimers, such as about 2 wt. % or less, or about 1 wt. % or less based on total oligomers present. Optionally, other branched paraffin dimers or other suitable components may also be present in the heat transfer fluids, as discussed above.

The heat transfer fluid may be in contact with an outer surface of the heat-generating component, including jacketed and immersed configurations. Jacketed configurations include any configuration in which the heat transfer fluid does not contact the cell components of a battery or other heat-generating component directly. Immersed configurations, in contrast, include any configuration in which one or more cell components of a battery or other heat-generating component are directly contacted by the heat transfer fluid. That is, immersed configurations do not necessarily imply that a battery or other heat-generating component is fully submerged in the heat transfer fluid, although it may be. Certain immersed configurations may include those in which a battery cell is enclosed in a suitable container and the heat transfer fluid circulated between the walls of the container and the battery cell. In more specific embodiments, the heat-generating component may be at least partially immersed in the heat transfer fluid. In some embodiments, the heat-generating component may be fully immersed in the heat transfer fluid. The heat transfer fluid may be in an open or closed system when contacting the outer surface of the heat-generating component. A closed system, for example, may be configured to circulate the heat transfer fluid between the heat-generating component and a heat-dissipating structure, such as a heat sink, radiator, or similar structure that is capable of removing excess heat from the heat transfer fluid.

In other embodiments, the heat-generating component may comprise a plurality of interior channels configured for circulating the heat transfer fluid. Thus, the heat transfer fluids may also contact additional surfaces of the heat-generating component other than the outer surface. The engineering design of a particular heat-generating component, such as the electric motor or battery of an electric vehicle, may determine whether interior channels may suitably be present. Emerging electric motor designs, such as electric motors directly mounted to each axle, for example, may require a different cooling approach than those incorporated conventionally within the vehicle's body. When interior channels may be suitably present, the heat transfer fluid may be circulated within the interior channels in addition to contacting the outer surface of the heat-generating component in some embodiments. When a heat transfer fluid contacts the outer surface of the heat-generating component and is also circulated within the interior channels of the heat-generating component, two different sources of the heat transfer fluids may be used. For example, in particular embodiments, the heat transfer fluids contacting the outer surface and circulated within the interior channels may be isolated from one another (e.g., by being present in separate reservoirs), such that the heat transfer fluids do not intermingle. Moreover, the heat transfer fluids contacting the outer surface and circulated within the interior channels may be the same or different, according to various embodiments of the present disclosure.

In some or other embodiments, electric vehicles of the present disclosure may further comprise a heat-dissipating structure in fluid communication with the heat transfer fluid. In illustrative embodiments, the heat-dissipating structure may comprise a conventional heat sink such as a radiator, heat-dissipating fins, or similar air cooling structure. Non-conventional and emerging heat-dissipating structures may also be used in various instances. The heat transfer fluid may be configured to circulate between the heat-generating component and the heat-dissipating structure in more particular embodiments. Any type of pump may aid in circulating the heat transfer fluid from the heat-generating component to the heat-dissipating structure.

In still more particular embodiments, the heat-generating component within the electric vehicles described herein may be a battery, an electric motor, a plurality of electric motors, a power component, a motor component, an axle, electronics, or any combination thereof. Power components may include, for example, DC/AC inverters, DC/DC converters, or AC/DC converters, for example. High-power rapid charging stations for electric vehicles may also be cooled using the heat transfer fluids disclosed herein. In some embodiments, the heat transfer fluids described herein may contact at least an outer surface of a battery used in powering the electric vehicle, including immersion or partial immersion of the battery in the heat transfer fluid. The motor or motor components of the electric vehicle may be thermally regulated by a heat transfer fluid of the present disclosure or by conventional heat transfer fluids, such as an aqueous glycol solution. In more particular embodiments, however, both the battery and the motor or motor components of an electric vehicle may be in fluid communication with one or more of the heat transfer fluids described herein. The heat transfer fluid in fluid communication with the battery and the motor or motor components may originate from a common source, or the heat transfer fluids in fluid communication with the battery and with the motor or motor components may originate from different sources. Accordingly, cooling systems suitable for thermally regulating the battery and the electric motor of an electric vehicle may be the same or different in the disclosure herein.

In view of the foregoing, the present disclosure also describes battery systems comprising a heat transfer fluid of the present. Battery systems described herein may comprise a battery, such as a lithium-ion battery, and a heat transfer fluid in contact with the battery. Any of the heat transfer fluids specified herein may be present in the battery systems.

According to particular embodiments of the present disclosure, the heat transfer fluid may be in contact with an outer surface of the battery, including jacketed and immersion configurations. In more specific embodiments, the battery may be at least partially immersed in the heat transfer fluid. In some embodiments, the battery may be fully immersed in the heat transfer fluid, including immersion of the leads of the battery within the heat transfer fluid. The heat transfer fluid contacting an outer surface of the battery may be in an open or closed system. In some or other embodiments, the battery may comprise a plurality of interior channels configured for circulating the heat transfer fluid, such as between the battery and a heat-dissipating structure.

The battery systems disclosed herein may further comprise a heat-dissipating structure in fluid communication with the heat transfer fluid, in particular embodiments of the present disclosure. The battery systems may be further configured to circulate the heat transfer fluid between the heat-generating component and a heat-dissipating structure in particular embodiments. Suitable heat-dissipating structures may include, for example, a heat sink, radiator, or similar structure that is capable of removing excess heat from the heat transfer fluid.

The present disclosure also describes methods for providing thermal regulation of a heat-generating component in some or other embodiments of the present disclosure. Such methods may comprise: providing a heat transfer fluid, and operating or placing a heat-generating component in contact with the heat transfer fluid such that a temperature is maintained in a predetermined range. Any of the heat transfer fluids specified herein may be used. Operation of the heat-generating component may comprise any action that causes the heat-generating component to generate heat. For example, in the case of a battery, charging or discharging the battery may promote excess heat generation, as discussed herein. Thermal management of other heat-generating components such as computer processors within server farms and other high-power electronic components, for example, may also be addressed using the disclosure herein. Rapid charging stations for electric vehicles may also be addressed using the disclosure herein.

The methods may further comprise placing the heat transfer fluid in contact with a surface of the heat-generating component. Particular configurations may include placing the heat transfer fluid in contact with an outer surface of the heat-generating component, including immersion or partial immersion of the heat-generating component in the heat transfer fluid. Jacketed configurations of the heat transfer fluid also reside within the scope of the disclosure herein.

Methods of the present disclosure may further comprise circulating the heat transfer fluid, particularly circulating the heat transfer fluid between the heat-generating component and a suitable heat-dissipating structure, as discussed herein.

Embodiments disclosed herein include:

A. Heat transfer fluids. The heat transfer fluids comprise: a plurality of isomeric branched paraffins comprising a hydrogenated reaction product of one or more linear alpha olefins (LAOs) oligomerized with a $BF_3$ catalyst system, the plurality of isomeric branched paraffins comprising at least about 90 wt. % isomeric branched paraffin dimers; wherein the one or more LAOs have about 8 to about 12 carbon atoms; and wherein the plurality of isomeric branched paraffins collectively have a Mouromtseff Number of about 10,000 to about 16,000 kg/($s^{2.2}\cdot m^{0.6}\cdot K$) at 80° C., a thermal conductivity at 80° C. of about 0.125 W/m·K or higher, and a flash point of about 140° C. or higher.

B. Battery systems. The battery systems comprise: a battery; and the heat transfer fluid of A in contact with the battery.

C. Electric Vehicles. The electric vehicles comprise: a heat-generating component; and the heat transfer fluid of A in contact with the heat-generating component.

D. Thermal management systems comprising the heat transfer fluid of A, wherein the thermal management system is configured to circulate the heat transfer fluid between a heat-generating component and a heat-dissipating component.

E. Methods for transferring excess heat. The methods comprise: providing the heat transfer fluid of A; and operating or placing a heat-generating component in contact with the heat transfer fluid.

Embodiments A-E may have one or more of the following additional elements in any combination:

Element 1: wherein the heat transfer fluid comprises at least about 90 wt. % isomeric branched paraffins.

Element 2: wherein the heat transfer fluid comprises a plurality of isomeric branched paraffin dimers formed from a $C_{10}$ LAO.

Element 3: wherein the heat transfer fluid comprises at least about 90 wt. % isomeric branched paraffin dimers formed from a $C_{10}$ LAO.

Element 4: wherein the heat transfer fluid further comprises a plurality of isomeric branched paraffin trimers formed from oligomerization of the one or more LAOs with the $BF_3$ catalyst system.

Element 5: wherein the heat transfer fluid comprises a plurality of isomeric branched paraffin trimers formed from a $C_{10}$ LAO.

Element 6: wherein about 0.5 wt. % to about 2 wt. % of the isomeric branched paraffin trimers is present.

Element 7: wherein the heat transfer fluid further comprises at least one fluid selected from the group consisting of a Group I base oil, a Group II base oil, a Group III base oil, a Group IV base oil, a Group V base oil, and any combination thereof.

Element 8: wherein the heat transfer fluid further comprises at least one fluid selected from the group consisting of an aromatic hydrocarbon, a polyalphaolefin, a paraffin, an isoparaffin, ester, an ether, a Gas-to-Liquids (GTL) base oil, a Fischer-Tropsch wax-derived base oil, a wax-derived hydroisomerized base oil, a silicone oil, and any combination thereof.

Element 9: wherein the heat transfer fluid further comprises one or more additives selected from the group consisting of an antioxidant, a corrosion inhibitor, an antifoam agent, an antiwear additive, a dispersant, a detergent, a viscosity modifier, and any combination thereof.

Element 9A: wherein corrosion-causing ions are substantially absent from the plurality of isomeric branched paraffins.

Element 9B: wherein the heat transfer fluid further comprises at least one phenol-based antioxidant and at least one amine-based antioxidant, preferably wherein the heat transfer fluid comprises at least about 0.25 wt. % of the at least one phenol-based antoxidant and at least about 0.1 wt. % of the at least one amine-based antioxidant, or at least about 0.5 wt. % of the at least one phenol-based antioxidant and at least about 0.2 wt. % of the at least one amine-based antioxidant.

Element 10: wherein the heat transfer fluid is in contact with an outer surface of the battery.

Element 11: wherein the battery is at least partially immersed in the heat transfer fluid.

Element 12: wherein the battery comprises a plurality of interior channels configured for circulating the heat transfer fluid.

Element 13: wherein the battery system further comprises a heat-dissipating structure in fluid communication with the heat transfer fluid.

Element 14: wherein the battery system is configured to circulate the heat transfer fluid between the battery and the heat-dissipating structure.

Element 15: wherein the battery is a lithium-ion battery.

Element 16: wherein the heat transfer fluid is in contact with an outer surface of the heat-generating component.

Element 17: wherein the heat-generating component is at least partially immersed in the heat transfer fluid.

Element 18: wherein the heat-generating component comprises a plurality of interior channels configured for circulating the heat transfer fluid.

Element 19: wherein the electric vehicle further comprises a heat-dissipating structure in fluid communication with the heat transfer fluid.

Element 20: wherein the heat transfer fluid is configured to circulate between the heat-generating component and the heat-dissipating structure.

Element 21: wherein the heat-generating component is a battery, a power component, a motor, a motor component, electronics, or any combination thereof.

Element 22: wherein the method further comprises circulating the heat transfer fluid between the heat-generating component and a heat-dissipating structure.

Element 23: wherein the battery, the power component, the motor, the motor component, or electronics is present in an electric vehicle.

By way of non-limiting example, exemplary combinations applicable to A-E include, but are not limited to, 1 and 2; 1 and 3; 1 and 4; 1, 4 and 5; 1, 4 and 6; 1 and 4-6; 1, and 7, 8 and/or 9 or 9B; 2 and 3; 2 and 4; 2-4; 2, 4 and 5; 2, 4 and 6; 2, and 7, 8 and/or 9 or 9B; 2, 3 and 7, 8 and/or 9 or 9B; 2, 4 and 7, 8 and/or 9 or 9B; 2-4 and 7, 8 and/or 9 or 9B; 2-5 and 7, 8 and/or 9 or 9B; 2-4, 6 and 7, 8 and/or 9 or 9B; 2-6 and 7, 8 and/or 9 or 9B; 3 and 4; 3, 4 and 5; 3, 4 and 6; 3 and 4-6; 3 and 7, 8 and/or 9 or 9B; 3, 4 and 7, 8 and/or 9 or 9B; 3, 4, 5 and 7, 8 and/or 9 or 9B; 3, 6 and 7, 8 and/or 9 or 9B; 3, 4, 6 and 7, 8 and/or 9 or 9B; 3-6 and 7, 8 and/or 9 or 9B; 4 and 5; 4 and 6; 4-6; 4, 5 and 7, 8 and/or 9 or 9B; 4, 6 and 7, 8 and/or 9 or 9B; 4-6 and 7, 8 and/or 9 or 9B; 7 and 8; 7 and 9 or 9B; 7-9; and 8 and 9 or 9B. Additional exemplary non-limiting embodiments applicable to B include any of the foregoing applicable to A-E in further combination with 10, 11, 12, 13 and/or 14; any one of 1-9 or 9A or 9B in further combination with 10, 11, 12, 13 and/or 14; 10 and 11; 10 and 12; 10 and 13; 10 and 14; 10 and 15; 11 and 13; 11 and 14; 11 and 15; 12 and 13; 12 and 14; 12 and 15; 13 and 14; 13 and 15; and 14 and 15. Additional exemplary non-limiting embodiments applicable to C include any of the foregoing applicable A-E in further combination with 16, 17, 18, 19, 20 and/or 21; any one of 1-9 or 9A or 9B in further combination with 16, 17, 18, 19, 20 and/or 21; 16 and 17; 16 and 18; 16 and 19; 16 and 20; 16 and 21; 17 and 18; 17 and 19; 17 and 20; 17 and 21; 18 and 19; 18 and 20; 18 and 21; 19 and 20; 19 and 21; 20 and 21; 16 or 17, and 19; 16 or 17, and 20; 16 or 17, and 19 and 20; 16 or 17, and 19-21. Additional exemplary non-limiting embodiments applicable to D include any of the foregoing applicable A-E in further combination with 16, 17, 18, 19, 20 and/or 21; any one of 1-9 or 9A or 9B in further combination with 16, 17, 18, 19, 20 and/or 21; and 16 and 17. Additional exemplary non-limiting embodiments applicable to E include any of the foregoing applicable A-E in further combination with 16, 17, 18, 19, 20, 21, 22 and/or 23; any one of 1-9 or 9A or 9B in further combination with 16, 17, 18, 19, 20, 21, 22 and/or 23; 16 and 17; 16 and 18; 16 and 19; 16 and 20; 16 and 21; 16 and 22; 16 and 23; 17 and 18; 17 and 19; 17 and 20; 17 and 21; 17 and 22; 17 and 23; 18 and 19; 18 and 20; 18 and 21; 18 and 22; 18 and 23; 19 and 20; 19 and 21; 19 and 22; 19 and 23; 20 and 21; 20 and 22; 21 and 22; 21 and 23; 22 and 23; 16 or 17, and 19; 16 or 17, and 20; 16 or 17, and 19 and 20; 16 or 17, and 19-21; 16 or 17, and 22; and 16 or 17, and 23.

To facilitate a better understanding of the embodiments described herein, the following examples of various representative embodiments are given. In no way should the following examples be read to limit, or to define, the scope of the present disclosure.

EXAMPLES

Example 1: Isomeric $C_{20}$ Branched Paraffin Dimers Formed with a $BF_3$ Catalyst System. A commercial feed comprising ~94% $C_{10}$ LAOs with less than 15 ppm of water was passed through a vacuum vessel to remove dissolved gases. The LAOs were then oligomerized in the presence of a catalyst system comprising $BF_3$ and n-butanol/n-butyl acetate promoters (2.2:1 molar ratio of n-butanol:n-butyl acetate saturated with $BF_3$). Oligomerization was conducted using a continuous polymerization unit with a continuous stirred-tank reactor (CSTR). The reaction mixture was prepared by introducing $BF_3$, the n-butanol promoter, the n-butyl acetate promoter, and the LAO feed to the reactor, either sequentially or simultaneously. Process conditions and results are further specified in Table 3 below.

TABLE 3

| | |
|---|---|
| Promoter concentration (mmol/100 lbs feed) | 20 |
| Residence time (hrs) | ~1.7/0.7 |
| Pressure (psig) | ~5 |
| Temperature (° F.) | ~73 |
| Conversion (%) | ~90 |

Figure 2:
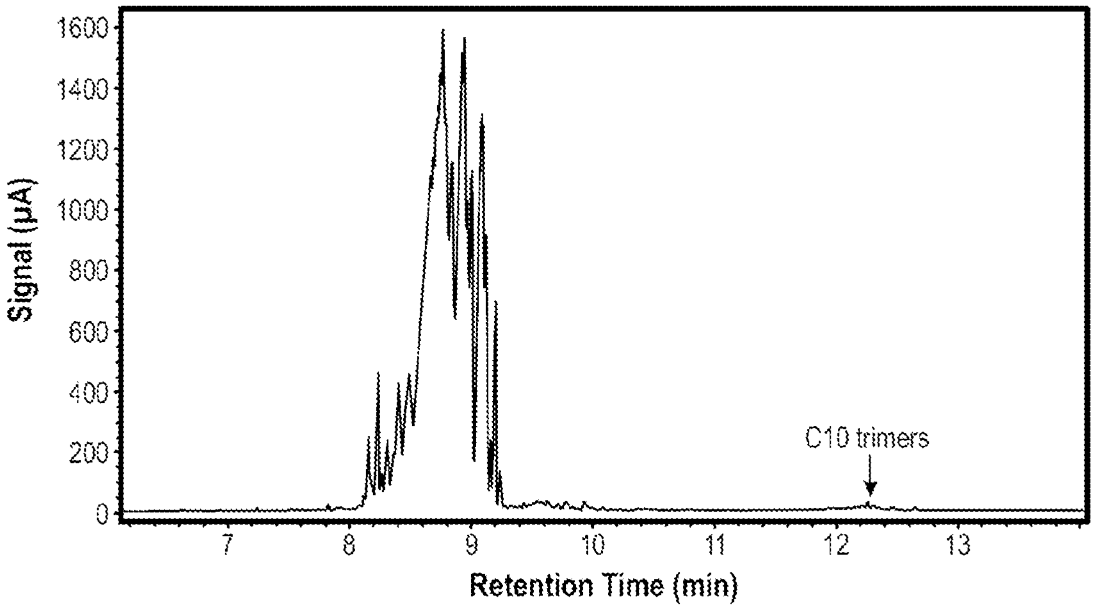
FIG. 2 shows a gas chromatograph of isomeric branched paraffin dimers obtained using a $BF_3$ catalyst system.

Upon completion of the reaction, the effluent was quenched with an alcohol and filtered through diatomaceous earth to remove the catalyst system and other particulates. The resulting mixture of olefin-containing LAO oligomers was further purified by distillation to remove unconverted monomer and obtain LAO dimers in up to about 99.8% purity. FIG. 2 shows an illustrative gas chromatograph of the LAO dimers formed with the $BF_3$ catalyst system. About 1.5 wt. % LAO trimer was retained with the LAO dimers to improve clarity after hydrogenation.

The LAO dimers were further hydrogenated using slurry hydrogenation in the presence of D-49 Ni/Ni monoxide powder catalyst supported on silicon dioxide to obtain the corresponding branched paraffin dimers in combination with a small amount of branched paraffin trimers. The hydrogenation reaction was carried out at approximately 230° C. and approximately 650 psi for about 1 hour. The catalyst charge was approximately 0.5 wt. %. The sample contained about 98.3 wt. % branched paraffin dimers, about 1.5 wt. % branched paraffin trimers, and about 0.3 wt. % hydrogenated $C_{10}$ LAO monomer (i.e., decane), determined by gas chromatography as shown in FIG. 2. Properties of the sample are specified in Table 4 below.

TABLE 4

| | |
|---|---|
| Kinematic Viscosity (100° C., ASTM D445) | 1.7 cSt |
| Kinematic Viscosity (80° C., ASTM D445) | 2.3 cSt |
| Kinematic Viscosity (40° C., ASTM D445) | 5.1 cSt |
| Kinematic Viscosity (0° C., ASTM D445) | 22.1 cSt |
| Kinematic Viscosity (−40° C., ASTM D445) | 249 cSt |
| Specific Gravity (15.6/15.6° C., ASTM D4052) | 0.798 |
| Appearance (−40° C., visual) | Bright and Clear |
| Pour Point (ASTM D5059) | −87° C. |
| Flash Point (ASTMD92-Cleveland open cup) | 155° C. |
| Density (15.6° C.) | 0.76 $g/cm^3$ |
| Density (80° C.) | 0.798 $g/cm^3$ |
| Specific Heat (20° C.) | 2.14 kJ/kg · K |
| Thermal Conductivity (80° C.) | 0.145 W/m · K |
| Dielectric Constant (1 kHz, 25° C.) | 2.1 |
| Breakdown Voltage (25° C.) | >29 kV |
| Electrical Conductivity (25° C.) | <50 pS/m |
| Volume Resistivity (25° C., 250 V) | $>2.7 \times 10^{14}$ GΩ · m |

Elemental analysis of the sample by ICP is shown below in Table 5, which shows that highly pure paraffinic products were obtained. Notably, potential corrosion-causing ions were substantially absent.

TABLE 5

| | |
|---|---|
| Total water | <25 ppm |
| Total sulfur | <0.1 ppm |
| Cl | <50 ppm |
| Na | ~3 ppm |
| B | ~4 ppm |
| Al | <0.2 ppm |
| Ca | ~3.5 ppm |
| Co | <0.2 ppm |
| Cr | <0.2 ppm |
| Cu | ~0.3 ppm |
| Li | <0.2 ppm |
| Ni | <0.2 ppm |
| Si | ~5 ppm |
| Ti | <0.2 ppm |
| P | <2 ppm |

Example 2: Formulated Heat Transfer Fluid. The branched paraffin sample from Example 1 was formulated with various additives for additional performance testing. Heat transfer fluid formulations are specified in Table 6 below. Viscosity performance is expressed as a percentage increase relative to the viscosity performance at room temperature. Data were otherwise collected in accordance with DKA Oxidation Test (CEC L-48-00, "Oxidation Stability of Lubricating Oils Use in Automotive Transmissions by Artificial Aging, 160° C., 192 hours), a commonly used industry standard test.

TABLE 6

| | Sample A | Sample B | Sample C | Sample D | Sample E |
|---|---|---|---|---|---|
| Anti-foam agent (wt. %) | 0.03 | 0.03 | 0.03 | 0.03 | 0.03 |
| Phenol-based Antioxidant (wt. %) | 0.95 | — | — | 0.95 | 2.00 |
| Amine-based Antioxidant (wt. %) | — | 0.50 | 3.00 | 0.25 | 0.25 |
| Example 1 Branched Paraffin (wt. %) | 99.02 | 99.47 | 96.97 | 98.77 | 97.72 |
| Viscosity Increase at 40° C. (%) | 94.8 | 226.3 | 8.5 | 1.3 | 1.9 |
| Viscosity Increase at 100° C. (%) | 49.1 | 107.9 | 4.8 | 1.6 | 1.2 |
| Oxidation by FTIR (peak area increase (area/cm/mm) | 3100.53 | 2636.4 | 151.1 | 23.6 | 38.7 |
| Sludge Rating | Aspect 1 | Aspect 1 | Aspect 1 | Aspect 1 | Aspect 1 |

As shown, the combination of antioxidants afforded significantly better performance than did either antioxidant alone.

All documents described herein are incorporated by reference herein for purposes of all jurisdictions where such practice is allowed, including any priority documents and/or testing procedures to the extent they are not inconsistent with this text. As is apparent from the foregoing general description and the specific embodiments, while forms of the disclosure have been illustrated and described, various modifications can be made without departing from the spirit and scope of the disclosure. Accordingly, it is not intended that the disclosure be limited thereby. For example, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

One or more illustrative incarnations incorporating one or more invention elements are presented herein. Not all features of a physical implementation are described or shown in this application for the sake of clarity. It is understood that in the development of a physical embodiment incorporating one or more elements of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

Whenever a numerical range with a lower limit and an upper limit is disclosed, any number and any included range falling within the range is specifically disclosed, including the lower limit and upper limit. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to one having ordinary skill in the art and having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein.

What is claimed is:

1. A battery system comprising:

a battery; and a heat transfer, wherein the heat transfer fluid includes, a plurality of isomeric branched paraffins comprising a hydrogenated reaction product of one or more linear alpha olefins (LAOs) oligomerized with a $BF_3$ catalyst system, the plurality of isomeric branched paraffins comprising at least about 90 wt. % isomeric branched paraffin dimers, wherein the one or more LAOs have about 8 to about 12 carbon atoms, and wherein the plurality of isomeric branched paraffins collectively have a Mouromtseff Number of about 10,000 to about 16,000 $kg/(s^{2.2} \cdot m^{0.6} \cdot K)$ at 80° C., a thermal conductivity at 80° C. of about 0.125 W/m·K or higher, and a flash point of about 140° C. or higher.

2. The battery system of claim 1, wherein the heat transfer fluid comprises a plurality of isomeric branched paraffin dimers formed from a $C_{10}$ LAO.

3. The battery system of claim 1, wherein the heat transfer fluid comprises at least about 90 wt. % isomeric branched paraffin dimers formed from a $C_{10}$ LAO.

4. The battery system of claim 1, wherein the heat transfer fluid further comprises:

a plurality of isomeric branched paraffin trimers formed from oligomerization of the one or more LAOs with the $BF_3$ catalyst system.

5. The battery system of claim 4, wherein the heat transfer fluid comprises a plurality of isomeric branched paraffin trimers formed from a $C_{10}$ LAO.

6. The battery system of claim 4, wherein about 0.5 wt. % to about 2 wt. % of the isomeric branched paraffin trimers is present.

7. The battery system of claim 1, wherein the heat transfer fluid further comprises:

at least one fluid selected from the group consisting of a Group I base oil, a Group II base oil, a Group III base oil, a Group IV base oil, a Group V base oil, and any combination thereof.

8. The battery system of claim 1, wherein the heat transfer fluid further comprises:

at least one fluid selected from the group consisting of an aromatic hydrocarbon, a polyalphaolefin, a paraffin, an isoparaffin, ester, an ether, a Gas-to-Liquids (GTL) base oil, a Fischer-Tropsch wax-derived base oil, a wax-derived hydroisomerized base oil, a silicone oil, and any combination thereof.

9. The battery system of claim 1, wherein the heat transfer fluid further comprises:

one or more additives selected from the group consisting of an antioxidant, a corrosion inhibitor, an antifoam agent, an antiwear additive, a dispersant, a detergent, a viscosity modifier, and any combination thereof.

10. The battery system of claim 1, wherein corrosion-causing ions are substantially absent from the plurality of isomeric branched paraffins.

11. The battery system of claim 1, wherein the heat transfer fluid further comprises:

at least about 0.25 wt. % of at least one phenol-based antioxidant, and at least about 0.1 wt. % of at least one amine-based antioxidant.

12. The battery system of claim 1, wherein the heat transfer fluid further comprises:

at least about 0.5 wt. % of at least one phenol-based antioxidant, and at least about 0.2 wt. % of at least one amine-based antioxidant.

13. The battery system of claim 1, wherein the heat transfer fluid is in contact with an outer surface of the battery.

14. The battery system of claim 1, wherein the battery is at least partially immersed in the heat transfer fluid.

15. The battery system of claim 1, wherein the battery comprises a plurality of interior channels configured for circulating the heat transfer fluid.

16. The battery system of claim 1, further comprising:

a heat-dissipating structure in fluid communication with the heat transfer fluid.

17. The battery system of claim 16, wherein the battery system is configured to circulate the heat transfer fluid between the battery and the heat-dissipating structure.

18. The battery system of claim 1, wherein the battery is a lithium-ion battery.

19. An electric vehicle comprising:

a heat-generating component; and the battery system of claim 1, wherein the heat transfer fluid is in contact with the heat-generating component.

20. The electric vehicle of claim 19, wherein the heat transfer fluid is in contact with an outer surface of the heat-generating component.

21. The electric vehicle of claim 19, wherein the heat-generating component is at least partially immersed in the heat transfer fluid.

22. The electric vehicle of claim 19, wherein the heat-generating component comprises a plurality of interior channels configured for circulating the heat transfer fluid.

23. The electric vehicle of claim 19, further comprising:

a heat-dissipating structure in fluid communication with the heat transfer fluid.

24. The electric vehicle of claim 23, wherein the heat transfer fluid is configured to circulate between the heat-generating component and the heat-dissipating structure.

25. The electric vehicle of claim 19, wherein the heat-generating component is a power component, a motor, a motor component, electronics, or any combination thereof.

26. A thermal management system comprising the battery system of claim 1, the thermal management system being configured to circulate the heat transfer fluid between a heat-generating component and a heat-dissipating structure.

27. The thermal management system of claim 26, wherein the heat transfer fluid is in contact with an outer surface of the heat-generating component.

28. The thermal management system of claim 26, wherein the heat-generating component is at least partially immersed in the heat transfer fluid.

29. A method comprising:

providing a heat transfer fluid, wherein the heat transfer fluid includes, a plurality of isomeric branched paraffins comprising a hydrogenated reaction product of one or more linear alpha olefins (LAOs) oligomerized with a $BF_3$ catalyst system, the plurality of isomeric branched paraffins comprising at least about 90 wt. % isomeric branched paraffin dimers, wherein the one or more LAOs have about 8 to about 12 carbon atoms, and wherein the plurality of isomeric branched paraffins collectively have a Mouromtseff Number of about 10,000 to about 16,000 $kg/(s^{2.2} \cdot m^{0.6} \cdot K)$ at 80° C., a thermal conductivity at 80° C. of about 0.125 W/m·K or higher, and a flash point of about 140° C. or higher; and operating or placing a heat-generating component in contact with the heat transfer fluid, wherein the heat-generating component is a battery, a power component, a motor, a motor component, electronics, or any combination thereof, which is present in an electric vehicle.

30. The method of claim 29, wherein the heat transfer fluid is in contact with an outer surface of the heat-generating component.

31. The method of claim 29, wherein the heat-generating component is at least partially immersed in the heat transfer fluid.

32. The method of claim 29, further comprising:

circulating the heat transfer fluid between the heat-generating component and a heat-dissipating structure.

33. The method of claim 29, wherein the battery is a lithium-ion battery.

* * * * *